(12) United States Patent
Akiyama

(10) Patent No.: US 9,167,387 B2
(45) Date of Patent: Oct. 20, 2015

(54) ELECTRONIC DEVICE, INFORMATION DISTRIBUTION SYSTEM, COMPUTER READABLE MEDIUM, AND POSITION DEPENDENT INFORMATION PROVIDING METHOD

(71) Applicant: FUJITSU LIMITED, Kawasaki-shi, Kanagawa (JP)

(72) Inventor: Masaki Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 13/964,346

(22) Filed: Aug. 12, 2013

(65) Prior Publication Data

US 2014/0080440 A1    Mar. 20, 2014

Related U.S. Application Data

(63) Continuation of application No. PCT/JP2011/056430, filed on Mar. 17, 2011.

(51) Int. Cl.
*H04W 4/02* (2009.01)
*H04L 12/14* (2006.01)
(Continued)

(52) U.S. Cl.
CPC ........... *H04W 4/025* (2013.01); *H04L 12/1435* (2013.01); *H04M 3/42374* (2013.01);
(Continued)

(58) Field of Classification Search
CPC .............................. H04W 4/025; H04W 4/021
USPC ................... 455/456.3, 408; 701/209, 430
See application file for complete search history.

(56) References Cited

U.S. PATENT DOCUMENTS 6,662,105 B1 * 12/2003 Tada et al. ..................... 701/420
7,072,670 B2    7/2006 Sato et al.
(Continued)

FOREIGN PATENT DOCUMENTS

EP      1128675 A2    8/2001
EP      2028448 A2    2/2009
(Continued)

OTHER PUBLICATIONS

Extended European Search Report mailed Jan. 8, 2014 in corresponding European Application No. 11861139.1.
(Continued)

*Primary Examiner* — David Q Nguyen
(74) *Attorney, Agent, or Firm* — Staas & Halsey LLP

(57) ABSTRACT

An electronic device that includes a schedule information detecting unit which detects a schedule according to which a user moves to a second geographical area outside a first geographical area, an information acquisition unit which acquires position dependent information in the second geographical area from a first server apparatus before moving to the second geographical area, a position dependent information storing unit, a positioning unit, an output information control unit which retrieves the position dependent information corresponding to the position of the electronic device from the position dependent information storing unit, an information quantity storing unit which stores information quantity data which indicates quantity of the information retrieved from the position dependent information storing unit, and an information quantity transmitting unit which transmits the information quantity data stored in the information quantity storing unit to a second server apparatus, when the electronic device is located outside the second geographical area.

9 Claims, 18 Drawing Sheets

(51) Int. Cl.
    H04W 4/26      (2009.01)
    H04M 1/725     (2006.01)
    G01C 21/36     (2006.01)
    H04M 3/42      (2006.01)
    H04M 15/00     (2006.01)

(52) U.S. Cl.
    CPC ............ H04W 4/021 (2013.01); H04W 4/26 (2013.01); *G01C 21/362* (2013.01); *H04L 12/1485* (2013.01); *H04M 1/72566* (2013.01); *H04M 1/72572* (2013.01); *H04M 3/42357* (2013.01); *H04M 15/8033* (2013.01); *H04M 15/8044* (2013.01); *H04M 2242/15* (2013.01); *H04M 2242/28* (2013.01); *H04M 2250/10* (2013.01); *H04M 2250/12* (2013.01)

(56) References Cited

U.S. PATENT DOCUMENTS

| | | | |
|---|---|---|---|
| 7,681,791 B1* | 3/2010 | Beveridge | .................... 235/385 |
| 2001/0025269 A1 | 9/2001 | Otsuka | |
| 2004/0123312 A1 | 6/2004 | Kimura | |
| 2007/0050131 A1* | 3/2007 | Masuda | ........................ 701/209 |
| 2010/0063854 A1 | 3/2010 | Purvis et al. | |
| 2012/0084001 A1* | 4/2012 | Suzuki | ........................ 701/430 |
| 2013/0096966 A1* | 4/2013 | Barnes, Jr. | ....................... 705/5 |

FOREIGN PATENT DOCUMENTS

| | | |
|---|---|---|
| JP | 2001-236391 | 8/2001 |
| JP | 2004-78514 | 3/2004 |
| JP | 2004-153787 | 5/2004 |
| JP | 2004-235681 | 8/2004 |
| JP | 2006-338553 | 12/2006 |
| JP | 2007-60434 | 3/2007 |

OTHER PUBLICATIONS

English Translation (by computer) of Japanese Patent Publication 2001-236391 (Ref. AG in the IDS filed Aug. 12, 2013).

Office Action mailed May 20, 2014 in corresponding Japanese Patent Application No. 2013-504486.

International Search Report mailed Jun. 7, 2011 for corresponding International Application No. PCT/JP2011/056430.

* cited by examiner

FIG. 5A

| SCHEDULED ITEM NUMBER | STARTING DATE AND TIME | FINISHING DATE AND TIME | PLACE | CONTENT OF SCHEDULE | AREA FLAG | AREA REGIONAL NAME |
|---|---|---|---|---|---|---|
| 1 | 2010/12/10 10:00 | 2010/12/10 12:00 | AAA EXCHANGE | DELIVERY OF GOODS | OFF | |
| 2 | 2010/12/10 16:00 | 2010/12/10 17:30 | BBB LIFE INSURANCE COMPANY CCC BRANCH | MEETING | OFF | |
| 3 | 2010/12/12 10:00 | 2010/12/12 12:00 | DDD EXCHANGE | TOUR | ON | UNITED STATES |
| 4 | 2010/12/12 14:00 | 2010/12/12 16:00 | FFF FEDERAL RESERVE BANK | MEETING | ON | UNITED STATES |
| 5 | 2010/12/12 17:30 | 2010/12/13 8:00 | GGG HOTEL | STAY | ON | UNITED STATES |
| 6 | 2010/12/13 19:00 | 2010/12/13 22:00 | HHH BANK JJJ HEAD OFFICE | BUSINESS ENTERTAINMENT | OFF | |

FIG. 5B

| SCHEDULED ITEM NUMBER | AIRLINE | FLIGHT NUMBER | DEPARTURE AIRPORT | DEPARTURE DATE AND TIME | ARRIVAL AIRPORT | ARRIVAL DATE AND TIME |
|---|---|---|---|---|---|---|
| 1 | | | | | | |
| 2 | | | | | | |
| 3 | X AIRLINE | 123 | NARITA INTERNATIONAL AIRPORT | 2010/12/11 11:20 | EEE INTERNATIONAL AIRPORT | 2010/12/12 7:50 |
| 4 | | | | | | |
| 5 | | | | | | |
| 6 | Y AIRLINE | 456 | EEE INTERNATIONAL AIRPORT | 2012/12/13 11:15 | NARITA INTERNATIONAL AIRPORT | 2012/12/13 15:25 |

FIG. 6A

SUBWAY | ON FOOT
EEE AIRPORT STATION 2010/12/12 8:30 → JJJ LINE (40 MINUTES) ($2.25) → KKK STATION 2010/12/12 9:10 → LLL STREET 3 MINUTES → DDD EXCHANGE 2010/12/12 9:13

BUS | ON FOOT
EEE AIRPORT STATION 2010/12/12 8:40 → AIRPORT LINER (60 MINUTES) ($27) → KKK STATION 2010/12/12 9:40 → LLL STREET 3 MINUTES → DDD EXCHANGE 2010/12/12 9:43

FIG. 6B

ON FOOT
DDD EXCHANGE 2010/12/12 13:58 → MMM STREET 2 MINUTES → FFF FEDERAL RESERVE BANK 2010/12/12 14:00

FIG. 6C

ON FOOT | SUBWAY
GGG HOTEL 2010/12/13 8:30 → LLL STREET 4 MINUTES → KKK STATION 2010/12/13 9:20 → JJJ LINE (40 MINUTES) ($2.25) → EEE AIRPORT STATION 2010/12/13 10:00

ON FOOT | BUS
GGG HOTEL 2010/12/13 8:40 → LLL STREET 4 MINUTES → KKK STATION 2010/12/13 9:15 → AIRPORT LINER (60 MINUTES) ($27) → EEE AIRPORT STATION 2010/12/13 10:15

FIG. 8

| DATA IDENTIFIER | DATA QUANTITY (byte) |
|---|---|
| r001 | 1200 |
| r002 | 600 |
| r003 | 1200 |
| m101 | 30000 |
| m201 | 30000 |
| m301 | 30000 |
| m401 | 30000 |
| m501 | 30000 |
| m601 | 30000 |
| m602 | 30000 |
| m603 | 30000 |
| m604 | 30000 |
| m701 | 30000 |
| m702 | 30000 |
| m703 | 30000 |
| m704 | 30000 |
| m801 | 30000 |
| m802 | 30000 |
| m803 | 30000 |
| m804 | 30000 |

FIG. 9

| DATA IDENTIFIER | DATA QUANTITY (byte) | USED FLAG |
|---|---|---|
| r001 | 1200 | ON |
| r002 | 600 | ON |
| r003 | 1200 | ON |
| m101 | 30000 | OFF |
| m201 | 30000 | ON |
| m301 | 30000 | ON |
| m401 | 30000 | ON |
| m501 | 30000 | ON |
| m601 | 30000 | ON |
| m602 | 30000 | OFF |
| m603 | 30000 | OFF |
| m604 | 30000 | OFF |
| m701 | 30000 | ON |
| m702 | 30000 | ON |
| m703 | 30000 | OFF |
| m704 | 30000 | OFF |
| m801 | 30000 | ON |
| m802 | 30000 | ON |
| m803 | 30000 | ON |
| m804 | 30000 | ON |

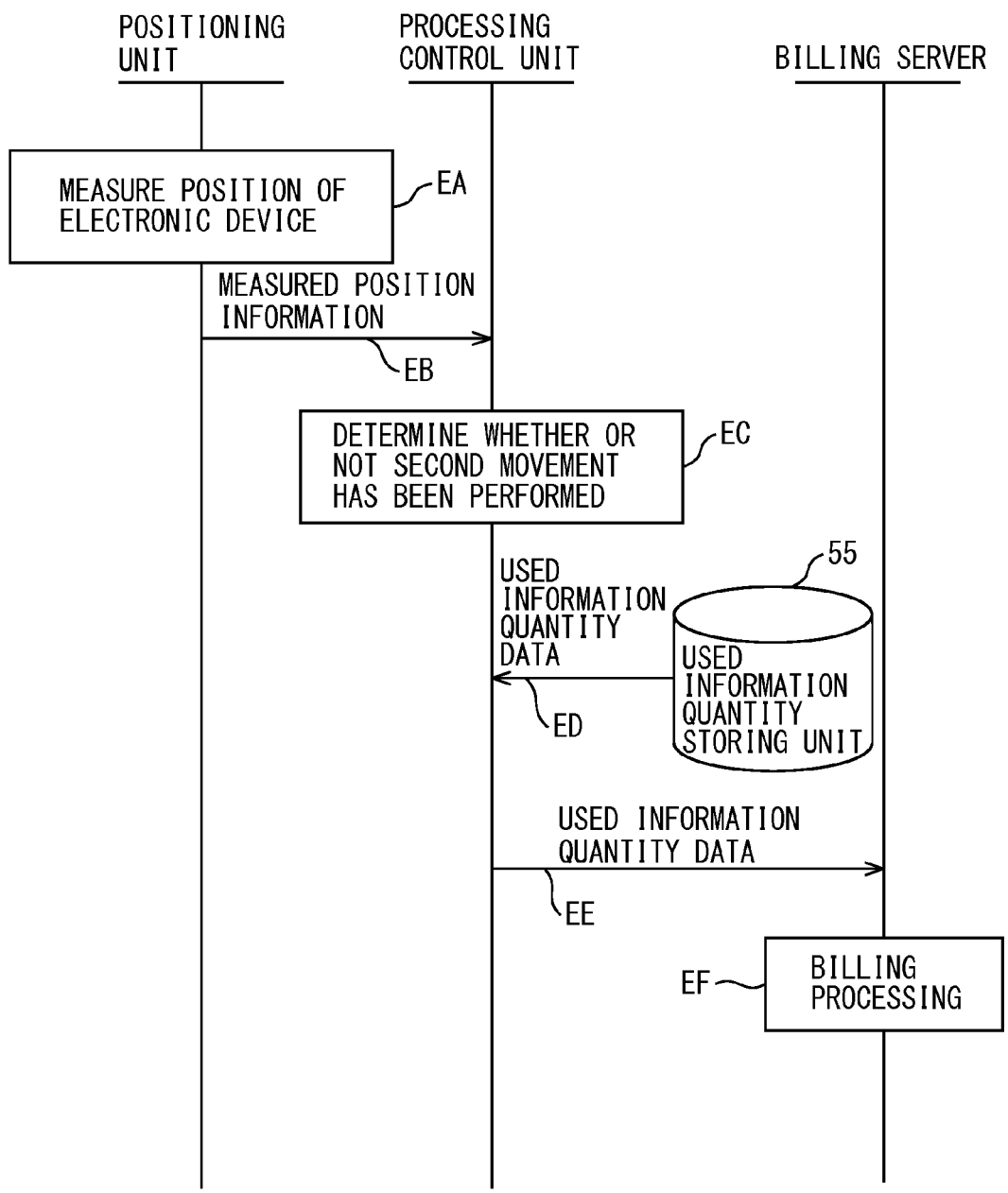

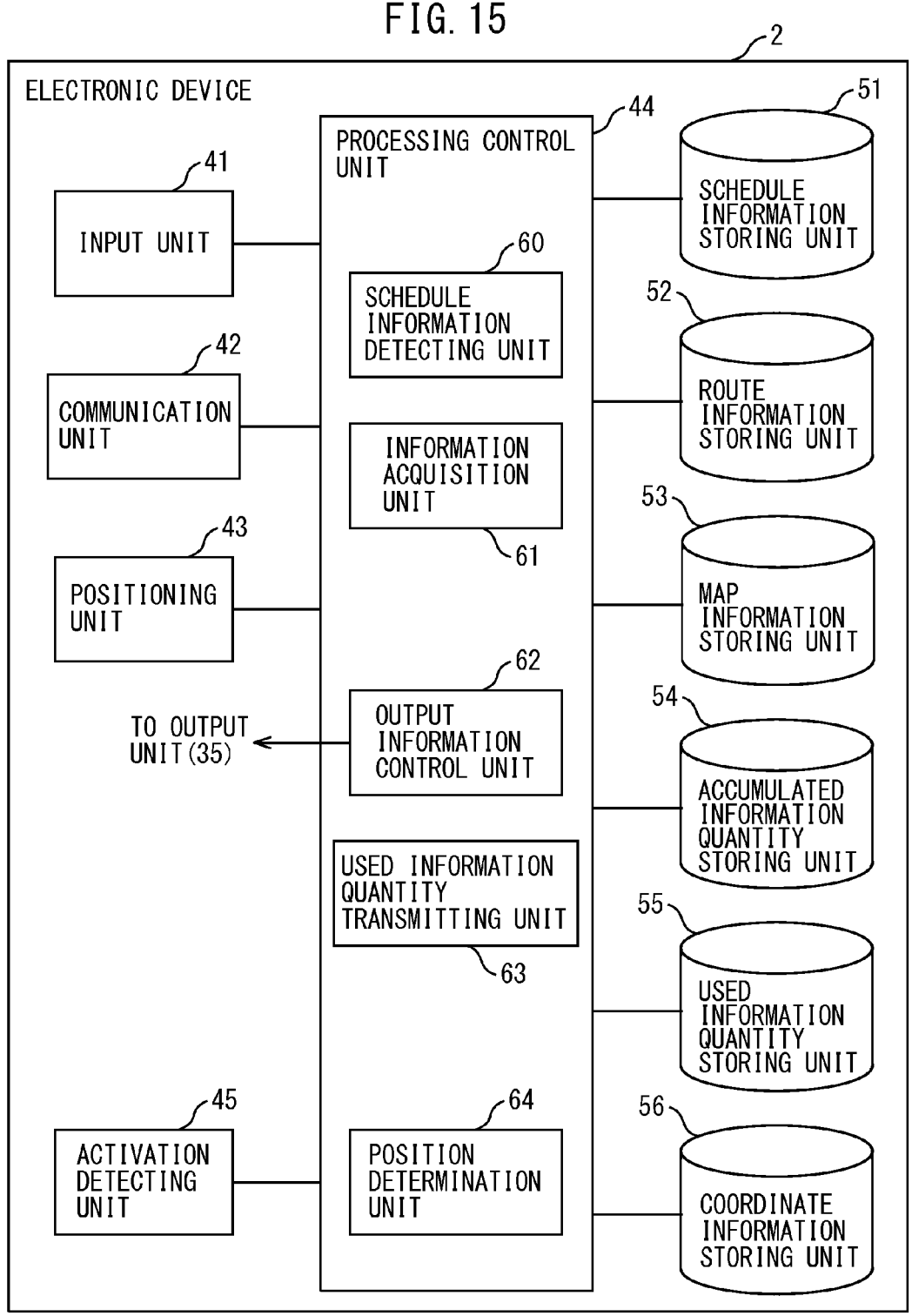

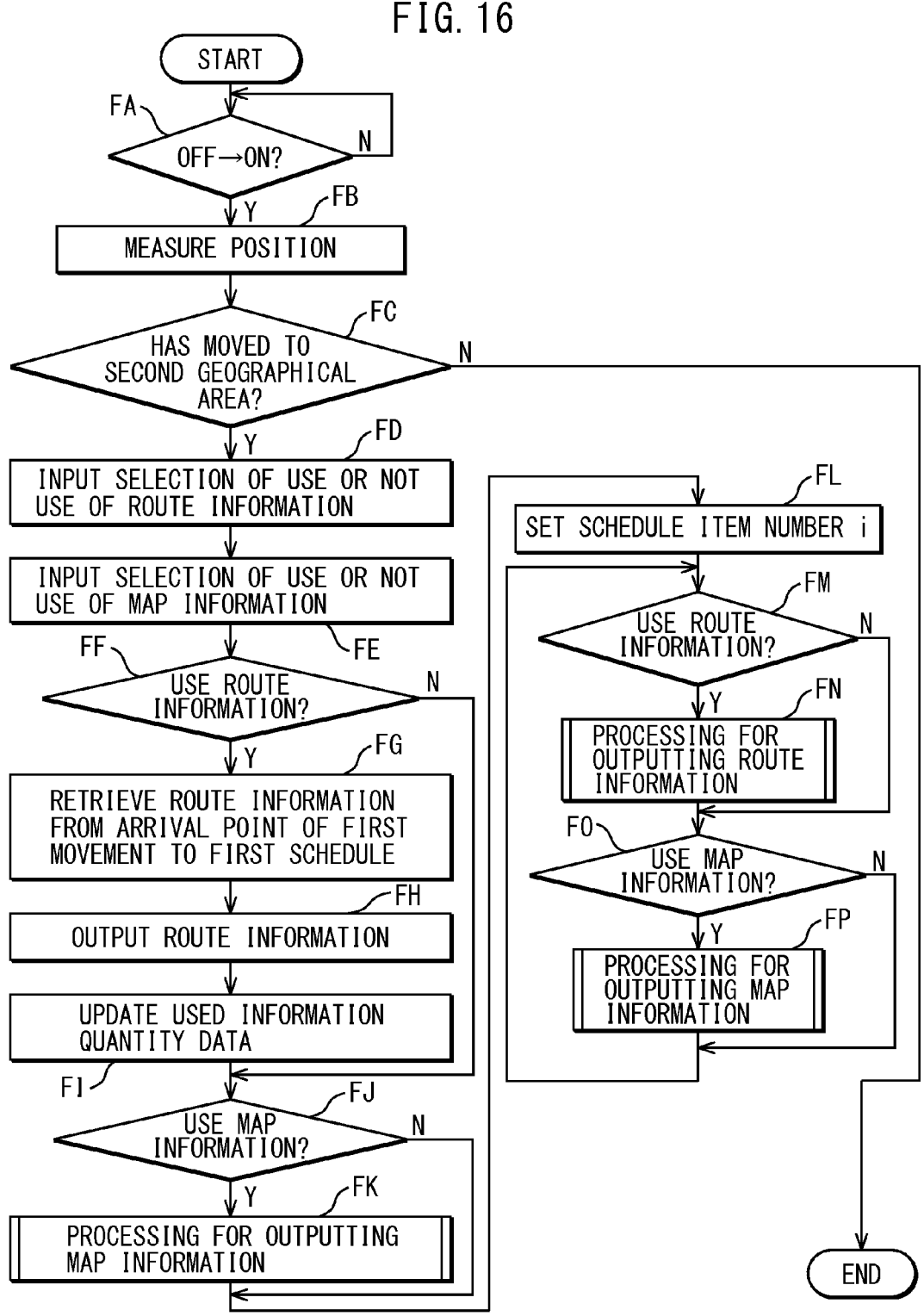

ELECTRONIC DEVICE, INFORMATION DISTRIBUTION SYSTEM, COMPUTER READABLE MEDIUM, AND POSITION DEPENDENT INFORMATION PROVIDING METHOD

CROSS-REFERENCE TO RELATED APPLICATIONS

This application is a continuation application based on International application No. PCT/JP2011/056430, filed on Mar. 17, 2011, the entire contents of which are incorporated herein by reference.

FIELD

The embodiments disclosed herein relate to a location-based service providing information depending on a position through a network.

BACKGROUND

A location-based service is known which provides position-dependent information depending on a position, to a communication apparatus. The provided position-dependent information is, for example, peripheral map information, route information which guides a moving route, and service information of periphery facilities. For example, an electronic device measures a current position by using positioning methods such as GPS (Global Positioning System) and an AFLT (Advanced Forward Link Trilateration). A communication apparatus transmits the measured current position to a server apparatus on a network, and downloads the position-dependent information from the server.

Moreover, a technique is known wherein the technique includes generating schedule data indicating contents of the schedule when a user registers a schedule of travelling abroad into a mobile phone, transmitting the schedule data from the mobile phone at the time of a location update, when a user holding the mobile phone moves to a communication area corresponding to a network to which the user does not subscribe, and distributing various kinds of information items to the mobile phone based on the schedule data by an information providing server.

Further, another technique is known, which includes inquiring, to a communication area information managing unit, whether or not the associated position is inside a communication area, with respect to the contents predicted to be referred to according to a movement based on a current position, a moving direction and a moving speed of a terminal, selecting one or more communication units with line quality sufficient to communicate when the terminal is outside the communication area, acquiring, in advance, the contents predicted to be referred to using the selected communication unit, and accumulating the acquired contents. The terminal device includes an acquisition content determining unit and a content acquisition unit. When a position corresponding to a position related content predicted to be referred to is outside the communication-capable area, the acquisition content determining unit selects the position related content as the position related content to be acquired at a current position. The content acquisition unit acquires the position related content selected by the acquisition content determining unit from a content server by wireless communications, and accumulates the acquired content in an accumulating unit. The acquisition content determining unit determines a moving route and a destination based on a user's action schedule or the like, and selects the moving route and the position related contents around the destination as reference candidate contents.

Related art is disclosed in Japanese Laid-open Patent Publications No. 2007-60434 and No. 2004-153787.

SUMMARY

An electronic device according to an aspect of an apparatus, includes a schedule information detecting unit which detects a schedule according to which a user moves from a first geographical area to a second geographical area outside the first geographical area by accessing schedule information of the user, an information acquisition unit which acquires position dependent information in the second geographical area from a first server apparatus connected through a network before a timing of the schedule according to which the user moves to the second geographical area, a position dependent information storing unit which stores the position dependent information acquired, a positioning unit which measures a position of the electronic device, an output information control unit which retrieves the position dependent information corresponding to the position of the electronic device in the second geographical area measured by the positioning unit from the position dependent information storing unit to output through an output unit, an information quantity storing unit which stores information quantity data which indicates information quantity of the information retrieved from the position dependent information storing unit, and an information quantity transmitting unit which transmits the information quantity data which indicates information quantity and is stored in the information quantity storing unit to a second server apparatus connected through the network, when the electronic device is located outside the second geographical area.

According to another aspect of an apparatus, there is provided an information distribution system including an electronic device, a first server apparatus, and a second server apparatus, wherein the electronic device, the first server apparatus, and the second server apparatus are connected through a network, and wherein, the electronic device includes a schedule information detecting unit which detects a schedule according to which a user moves from a first geographical area to a second geographical area outside the first geographical area by accessing schedule information of the user, an information acquisition unit which acquires position dependent information in the second geographical area from the first server apparatus before a timing of the schedule according to which the user moves to the second geographical area, a position dependent information storing unit which stores the position dependent information acquired, a positioning unit which measures a position of the electronic device, an output information control unit which retrieves the position dependent information corresponding to the position of the electronic device in the second geographical area measured by the positioning unit from the position dependent information storing unit to output through an output unit, an information quantity storing unit which stores information quantity data which indicates information quantity of the information retrieved from the position dependent information storing unit, and an information quantity transmitting unit which transmits the information quantity data which indicates the information quantity and is stored in the information quantity storing unit to the second server apparatus, when the electronic device is located outside the second geographical area.

According to an aspect of a computer-readable, non-transitory medium, there is provided a computer-readable, non-transitory medium storing a computer program causing a processor included in an electronic device to execute a process, the process comprising detecting a schedule according to which a user moves from a first geographical area to a second geographical area outside the first geographical area by accessing schedule information of the user, acquiring position dependent information in the second geographical area, from a first server apparatus connected to the electronic device through a network before a timing of the schedule according to which the user moves to the second geographical area, storing, into a storing unit of the electronic device, the position dependent information acquired, measuring a position of the electronic device, retrieving the position dependent information corresponding to the position of the electronic device in the second geographical area from the storing unit to output, storing, into the storing unit, information quantity data which indicates information quantity of the information retrieved from the storing unit, and transmitting the information quantity data which is stored in the storing unit to a second server apparatus connected to the electronic device through the network, when the electronic device is located outside the second geographical area.

According to another aspect of a method, there is provided a position dependent information providing method for providing position dependent information to an electronic device, the position dependent information providing method causing the electronic device to execute a process, the process comprising detecting a schedule according to which a user moves from a first geographical area to a second geographical area outside the first geographical area by accessing schedule information of the user, acquiring position dependent information in the second geographical area, from a first server apparatus connected to the electronic device through a network before a timing of the schedule according to which the user moves to the second geographical area, storing, into a storing unit of the electronic device, the position dependent information acquired, measuring a position of the electronic device, retrieving the position dependent information corresponding to the position of the electronic device in the second geographical area from the storing unit to output, storing, into the storing unit, information quantity data which indicates information quantity of the information retrieved from the storing unit, and transmitting the information quantity data which is stored in the storing unit to a second server apparatus connected to the electronic device through the network, when the electronic device is located outside the second geographical area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5A and FIG. 5B are diagrams depicting examples of schedule information.

FIG. 6A to FIG. 6C are diagrams depicting examples of route information.

FIG. 8 is a diagram depicting an example of information quantity data stored in an accumulated information storing unit.

FIG. 9 is a diagram depicting an example of used information quantity data stored in a used information storing unit.

FIG. 14 is an explanatory diagram of billing processing.

FIG. 15 is a diagram depicting a second configuration example of the electronic device.

FIG. 16 is an explanatory diagram of a second example of processing performed at the time of using the route information and the map information.

DESCRIPTION OF EMBODIMENTS

Depending on a user's current position, there is a case in which it is difficult for a user to receive a location-based service, and a case in which a user does not desire to receive the service. An example of a former case is when a communication service for receiving a location-based service due to a user's location is difficult to ascertain. For example, there may be many areas in foreign countries in which packet communication is not possible.

An example of the latter case is high cost for using a location-based service, depending on a user's location. According to development of international roaming in recent years, in many cases, a communication apparatus which subscribes a service of the carrier in one country can receive a location-based service in other countries. However, when a location-based service is used in other countries with the international roaming, the communication fee is high in many cases. Therefore, there are only a few users who use the location-based service in other countries at present.

In order to solve the above-mentioned matter, a measure can be assumed to be taken in which a user downloads position-dependent information in advance, before moving to a place at which a location-based service is difficult to be received, or a place at which it is not desired to receive the location-based service. However, according to such measure, when the information downloaded in advance is not actually used in the country, the information which is not used will also be charged and this leads to wasteful cost.

An object of a apparatus and a method disclosed herein is to enable billing in accordance with the information quantity actually used in the area concerned, when downloading position-dependent information to be used in the area concerned in advance before moving into the area concerned, in order to use a location-based service in the area.

According to an apparatus and a method disclosed herein, it enables billing in accordance with the information quantity actually used in the area concerned, when downloading position-dependent information to be used in the area concerned in advance before moving into the area concerned, in order to use a location-based service in the area.

Figure 1:
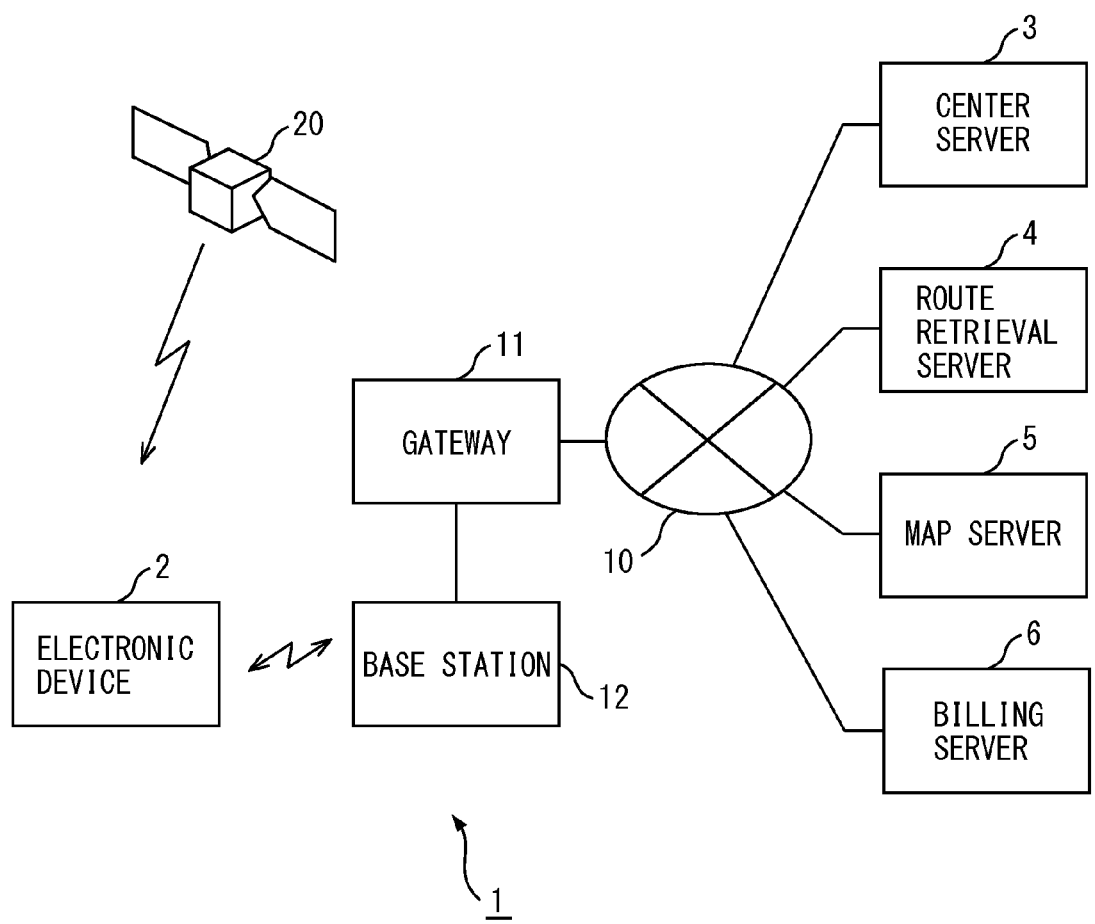
FIG. 1 is a diagram depicting a system configuration example of an information distribution system.

The preferred embodiments will be described with reference to accompanying drawings. FIG. 1 is a diagram depicting a system configuration example of an information distribution system. The information distribution system 1 includes an electronic device 2, a center server 3, a route retrieval server 4, a map server 5, and an billing server 6. The center server 3, the route retrieval server 4, the map server 5, and the billing server 6 are connected to a communication network 10, and can communicate with each other through the communication network 10.

The electronic device 2 can access a radio access network including a base station 12, and communicate with the above-mentioned servers 3 to 6 through a gateway apparatus 11 which is connected to the communication network 10. The information distribution system 1 provides a service in which position-dependent information depending on a position, i.e. a location-based service, to the electronic device 2 through the gateway apparatus 11 and the base station 12.

The electronic device 2 may include a GPS positioning function which receives GPS signals transmitted from GPS satellites 20 to perform a positioning. In addition to or instead of the function, the electronic device 2 may include an AFLT positioning function utilizing the base station 12.

The route retrieval server 4 receives a route retrieval request transmitted from the electronic device 2. The electronic device 2 transmits, to the route retrieval server 4, the route retrieval request which designates at least "departure place", "arrival place" and "departure time" of a route, or at least "departure place", "arrival place" and "arrival time" thereof. The route retrieval server 4 searches routes which satisfies the route retrieval request. The route retrieval server 4 sends back route information which is a search result to the electronic device 2.

The route retrieval server 4 provides coordinate information of landmarks with respect to the landmarks such as specific "name of a place" and "facilities". Coordinate information may be latitude and longitude information or information which specifies other geographical coordinates, for example. The electronic device 2 transmits a position information request designating a landmark to the route retrieval server 4. The route retrieval server 4 searches the inquired position of the landmark. The route retrieval server 4 sends back the position information which is a search result to the electronic device 2.

The map server 5 provides the map information of the place with respect to a specific "place". The electronic device 2 transmits a map information request designating a place. The map server 5 transmits the map information including a map image for a predetermined range centering on the designated place to the electronic device 2. The map information may include a plurality of images which have different scales.

The billing server 6 performs billing processing of the acquisition fee according to the information acquired by the electronic devices 2 regarding the location-based service provided by the information distribution system 1. For example, the billing server 6 may determine the fee for billing according to the information acquired by the electronic device 2, and may perform processing for settlement, such as a notification of the fee to financial institutions, and a withdrawal process, based on a user's registration information registered in advance. The center server 3 performs various kinds of processing for providing the location-based service by the information distribution system 1.

Figure 2:
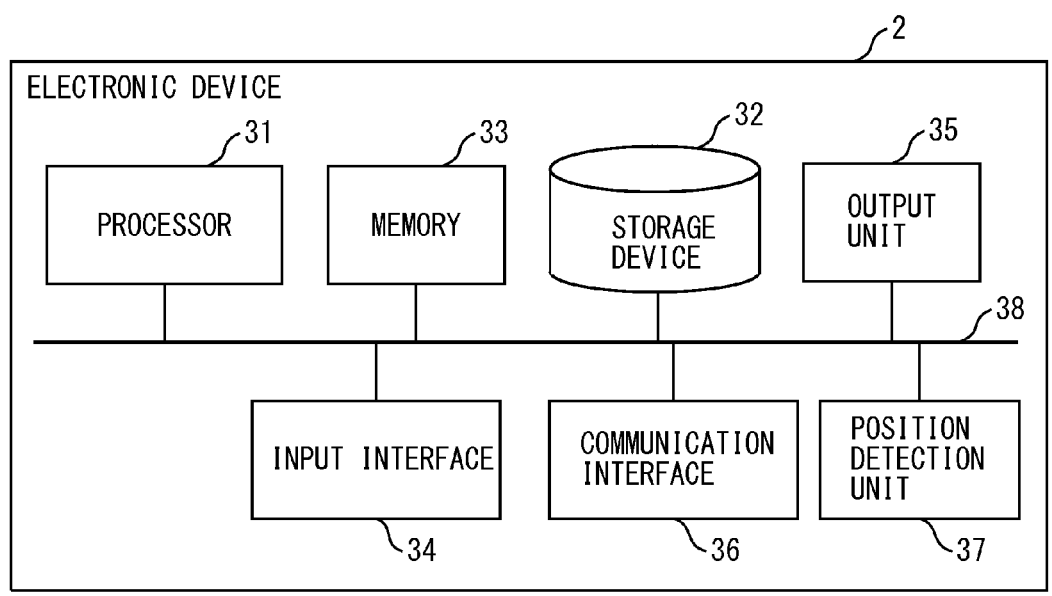
FIG. 2 is a diagram depicting one example of a hardware constitution of an electronic device.

FIG. 2 is a diagram depicting one example of a hardware constitution of the electronic device 2. The hardware constitution depicted in FIG. 2 is merely one example of the hardware constitution which realizes the electronic device 2. Any other hardware constitutions may be adopted as long as it performs the processing described below in the present application.

The electronic device 2 includes a processor 31, a storage device 32, a memory 33, an input interface 34, an output unit 35, a communication interface 36, a position detection unit 37, and a data bus 38. The electronic device 2 is an information processing device which transmits and receives information with each of servers 3 to 6 through the communication network 10, the gateway 11, and the base station 12, and can process the information which is transmitted to each of servers 3 to 6, and is received from each of servers 3 to 6. The electronic devices 2 may be, for example, a mobile phone, a mobile personal digital assistant, a personal computer, or the like.

The processor 31 performs, by executing programs stored in the storage device 32, each processing for controlling operation of the electronic device 2, and the following processing for realizing the function of the electronic device 2 for using the location-based service provided by the information distribution system 1. The programs which cause the processor 31 to perform the above-mentioned processing are stored in the storage device 32. The storage device 32 may include a hard disk, a nonvolatile memory, or the like, as storing means.

The memory 33 stores the program which is being executed by the processor 31 and the data temporarily used by the program. The memory 33 may include a read only memory (ROM) or a random access memory (RAM). The input interface 34 is an input device which receives an input operation by a user. The input interface 34 may be, for example, a keypad, a keyboard, a pointing device, a touch panel, or the like.

Figure 3A:
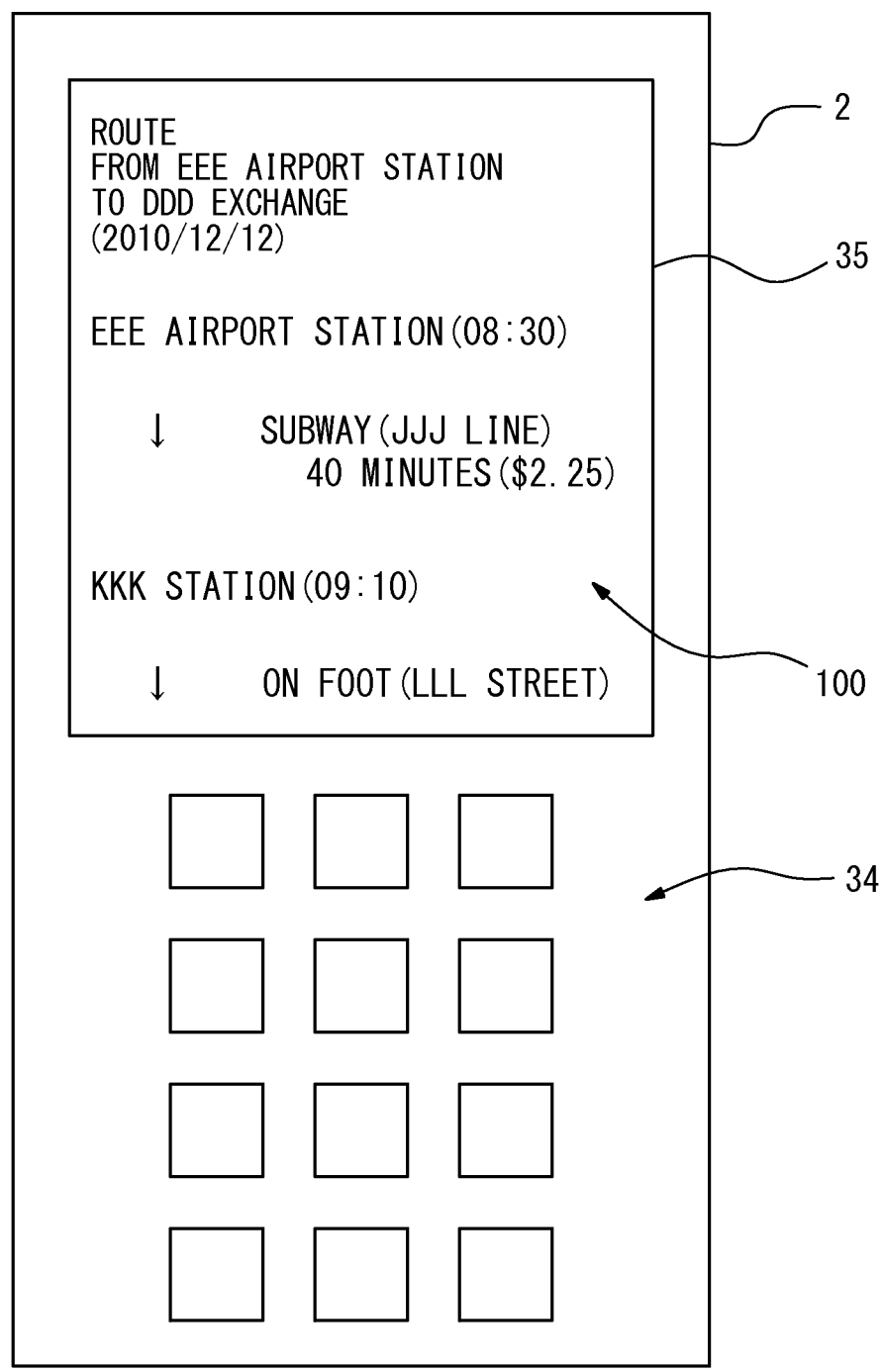
FIG. 3A and FIG. 3B are diagrams depicting examples of an output unit of the electronic device.
Figure 3B:
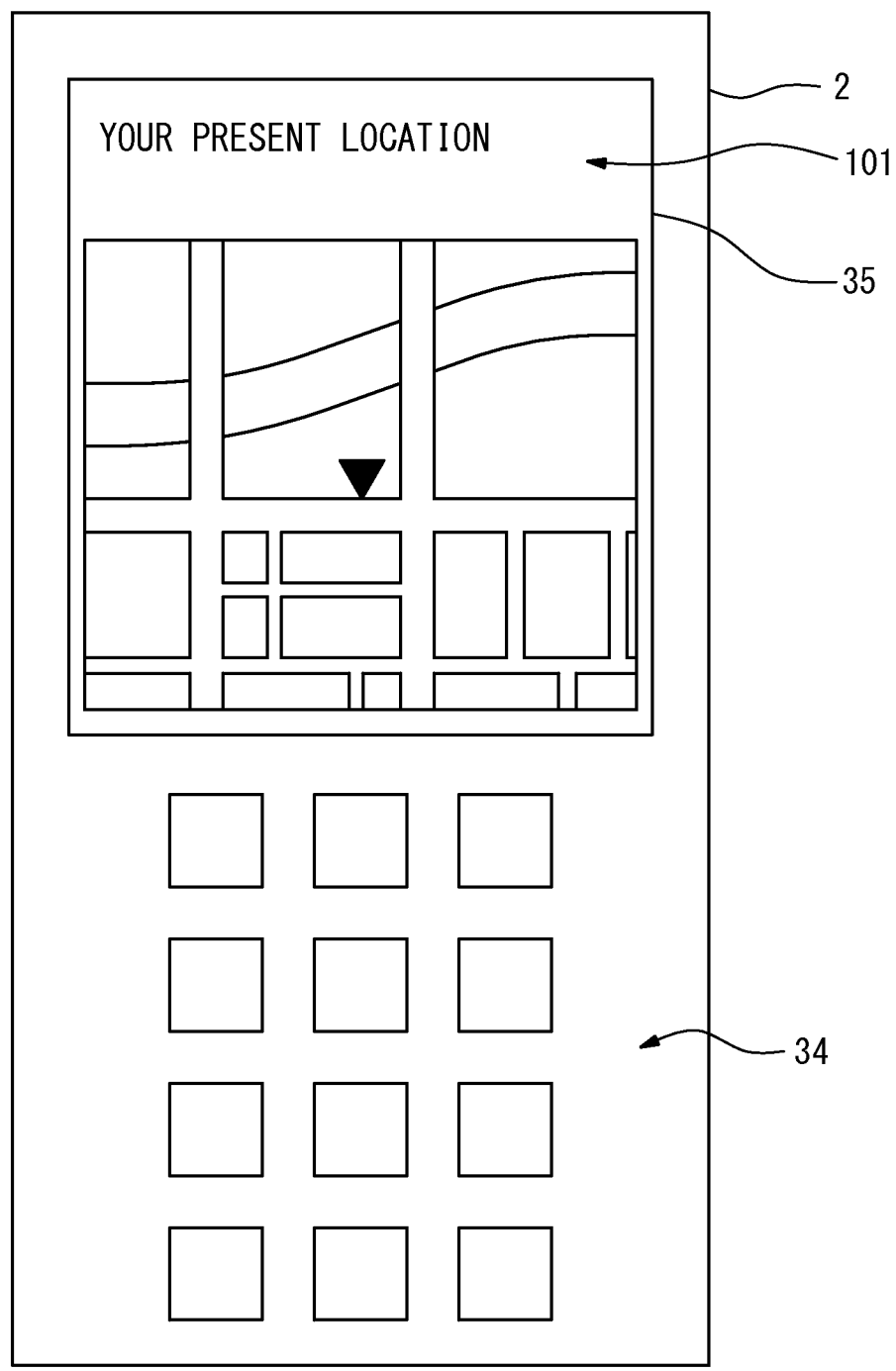

The output unit 35 outputs the information processed by the electronic device 2. FIG. 3A and FIG. 3B are diagrams depicting examples of the output unit 35 of the electronic device 2 in some embodiments. For example, the output unit 35 may be a display device which visually displays the information processed by the electronic device 2 to present the information to the user. The output unit 35 may be, for example, a liquid crystal display, a CRT (Cathode Ray Tube) display, or an organic electro-luminescence display. Note that, in the examples depicted in FIG. 3A and FIG. 3B, the electronic device 2 includes a keypad as the input interface 34.

The display device 35 is used to display, to a user, the route information received from the route retrieval server 4 and the map information received from the map server 5. For example, FIG. 3A depicts a state where the route information 100 "from the EEE airport station to the DDD Exchange, on Dec. 12, 2010" received from the route retrieval server 4 is displayed on the display device 35. FIG. 3B depicts a state where the map information 101 received from the map server 5 is displayed on the display device 35.

Referring to FIG. 2. The communication interface 36 performs transmitting and receiving processing of the signals among the respective server apparatuses 3 to 6. The position detection unit 37 detects a position of the electronic device 2. In some embodiments, the position detection unit 37 may be the GPS positioning device. In other embodiments, the position detection unit 37 may be the AFLT positioning device. Above-mentioned components 31 to 37 are electrically connected by the data bus 38.

Figure 4:
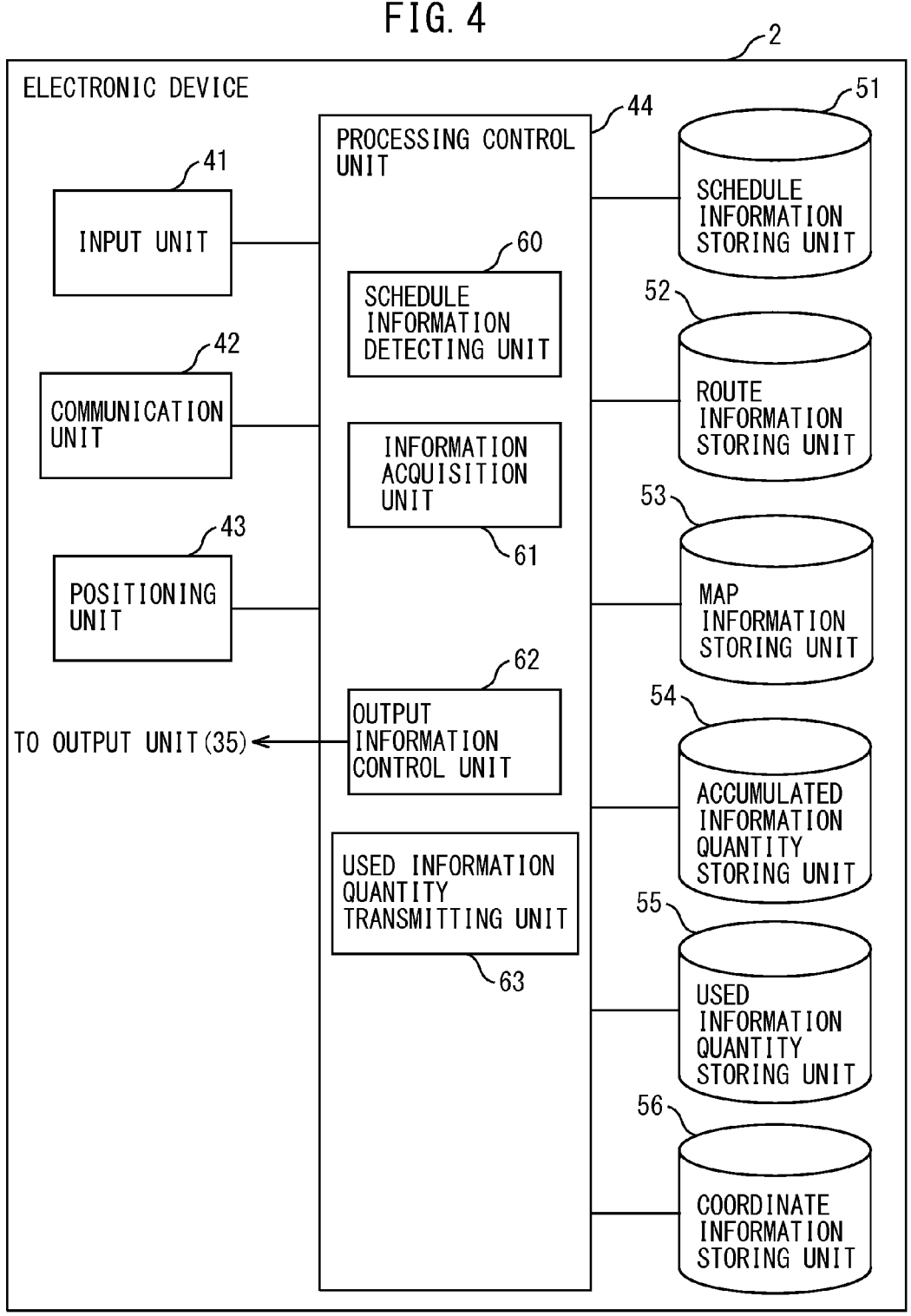
FIG. 4 is a schematic configuration diagram of a first example of the electronic device.

FIG. 4 is a schematic configuration diagram of a first example of the electronic device. The processor 31 depicted in FIG. 2 operates in cooperation with other hardware elements of the electronic device 2 as necessary according to the programs stored in the storage device 2 to perform information processing according to the components of the electronic device 2 depicted in FIG. 4. Note that FIG. 4 is depicted by focusing on the functions related to the following illustration. Therefore, the electronic device 2 may include other components other than the depicted components.

The electronic device 2 includes an input unit 41, a communication unit 42, a positioning unit 43, a processing control unit 44, a schedule information storing unit 51, a route information storing unit 52, a map information storing unit 53, an accumulated information quantity storing unit 54, a used information quantity storing unit 55, and a coordinate information storing unit 56. The input unit 41 performs receiving processing of an input operation from a user through the input interface 34. In some embodiments, the input unit 41 may receive a selection of whether or not the user uses the location-based service provided by the information distribution system 1, and a selection of whether or not the user uses the individual information such as the route information and the map information. The communication unit 42 performs the communication processing of exchanging the information with the respective servers 3 and 4. The positioning unit 43 measures the position of electronic device 2 according to the position detection unit 37.

The processing control unit 44 performs various kinds of processing illustrated below for using the location-based service provided by the information distribution system 1 on the electronic device 2. The processing control unit 44 includes a schedule information detecting unit 60, an information acquisition unit 61, an output information control unit 62 and a used information quantity transmitting unit 63.

The schedule information detecting unit 60 accesses the user's schedule information stored in the schedule information storing unit 51. The schedule information detecting unit 60 detects a schedule for the user to move from a first geographical area to a second geographical area based on the schedule information. For example, the first geographical area may be Japan. In this case, the second geographical area is a foreign country.

In other embodiments, the first geographical area may be one or more specific countries, and the second geographical area may be another country or countries other than the first geographical area or areas in this case. In other embodiments, the first geographical area may be an area in which the electronic device 2 can connect to the communication network 10. In this case, the second geographical area is an area in which the electronic device 2 is unable to connect to the communication network 10.

FIG. 5A is a diagram depicting a part of one example of the schedule information, and FIG. 5B is a diagram depicting another part of the example of the schedule information. Note that the schedule information detecting unit 60 may periodically access the schedule information. The schedule information storing unit 51 may be a storage area in the storage device 32 of the electronic device 2 depicted in FIG. 2. The same applies to the route information storage unit 52, the map information storing unit 53, the accumulated information quantity storing unit 54, the used information quantity storing unit 55, and the coordinate information storing unit 56.

The schedule information includes, as information elements for each schedule, a "schedule item number", "starting date and time", "finishing date and time", a "place", a "content of schedule", an "area flag", a "regional name", an "airline", a "flight number", a "departure airport", "departure date and time", an "arrival airport", and "arrival date and time". The schedule information of the respective schedules are ordered in time series with periods in which the respective schedules take place.

The information element "schedule item number" indicates an identification number for each schedule. The information elements "starting date and time" and "finishing date and time" indicate scheduled starting date and time and scheduled finishing date and time of each schedule. The information element "place" indicates a place where the event of each schedule takes place.

The information element "content of schedule" indicates a content of the event for each schedule. The information element "area flag" indicates at which area the event of each schedule takes place out of the first geographical area and the second geographical area. When the "area flag" is "ON", the event takes place in the second geographical area. When the "area flag" is "OFF", the event takes place in the first geographical area. The information element "regional name" indicates a name of the implementation place when the event takes place in the second geographical area.

The information element "airline" is an information element included in the schedule information when a schedule to be executed in the second geographical area exists after a schedule to be executed in the first geographical area, or when a schedule to be executed in the first geographical area exists after a schedule to be executed in the second geographical area. The same applies to the "flight number", the "departure airport", the "departure date and time", the "arrival airport", and the "arrival date and time".

Note that, in the following illustration, the schedule to be executed in the first geographical area may be referred to as a "schedule of first geographical area". In addition, the schedule to be executed in the second geographical area may be referred to as a "schedule of second geographical area". The movement from the first geographical area to the second geographical area in order to move to a place where the schedule of second geographical area is executed after the schedule of first geographical area may be referred to as a "first movement". The movement from the second geographical area to the first geographical area in order to move to a place where the schedule of first geographical area is executed after the schedule of second geographical area may be referred to as a "second movement".

The schedule which is to be executed first after the first movement and is registered in the schedule information may be referred to as a "first schedule after the first movement", and the schedule which is to be executed first after the second movement may be referred to as a "first schedule after the second movement". The schedule which is to be executed last before the first movement and is registered in the schedule information may be referred to as a "last schedule before the first movement", and the schedule which is to be executed last before the second movement may be referred to as a "last schedule before the second movement".

In the example depicted in FIG. 5A and FIG. 5B, schedule information on the first schedule after the first movement and the first schedule after the second movement includes the information elements of the "airline", the "flight number", the "departure airport", the "departure date and time", the "arrival airport", and the "arrival date and time".

Note that it is sufficient to store these information elements of the "airline", the "flight number", the "departure airport", the "departure date and time", the "arrival airport", and the "arrival date and time" in association with at least either the first schedule after the first movement or the last schedule before the first movement in the schedule information storing unit 51. For example, in other embodiments, these information elements may be included in the schedule information on the last schedule before the first movement. The same applies to the second movement.

The information element "airline" indicates an operating company of a transportation which is used for the first movement and the second movement. In the present embodiment, the transportation is an airplane, and the information element "airline" indicates an airline company which operates airplanes to be used for the first movement and the second movement. In other embodiments, the transportation may be a car, a train, etc. In such cases, the schedule information may include the information element indicating the operator of these transportations.

The information element "flight number" indicates information which designates the flight of the transportation used for the first movement and the second movement. The information elements "departure airport" and "arrival airport" indicate the departure point and the arrival point of the transportation used for the first movement and the second movement. In the present embodiment, these indicate the departure airport and the arrival airport of the flight used for the first movement and the second movement. When the transportation used for the first movement and the second movement is a car, a train, or the like, the schedule information may indicate the departure point and the arrival point of such transportations. The information elements "departure date and time" and "arrival date and time" indicate date and time of departure and date and time of arrival of the transportation used for the first movement and the second movement.

In the example depicted in FIG. 5A and FIG. 5B, a schedule in the schedule information with a schedule item number "1" indicates a schedule to be executed at the AAA Exchange in the first geographical area from 10:00 to 12:00 on Dec. 10, 2010, and the content of the schedule is a delivery of goods.

A schedule in the schedule information with a schedule item number "3" indicates a schedule to be executed at the DDD Exchange in the second geographical area from 10:00 to 12:00 on Dec. 12, 2010, and the content of the schedule is a tour. The airline and the flight number to be used for the first movement to execute the schedule with the schedule item number "3" are "X Airline" and "123", respectively, and the departure airport and the arrival airport are the "Narita International Airport" and the "EEE international airport", respectively. The departure date and time and arrival date and time of the airplane to be used for the first movement are 11:20 on Dec. 11, 2012, and 7:50 on December 12, respectively.

Referring to FIG. 4, the schedule information detecting unit 60 determines whether or not the information element "area flag" is changed to ON from OFF when the schedule information is referred to in accordance with the time series and may detect the schedule of a user moving from the first geographical area to the second geographical area by the determination result. In other embodiments, the schedule information detecting unit 60 may refer to the information elements "regional name" and "place" in accordance with the time series of schedules instead of the "area flag", to detect the schedule of a user moving from the first geographical area to the second geographical area.

Note that it is not necessary for the schedule information to always be stored in the schedule information storing unit 51. The schedule information may be stored in a server apparatus to which the electronic device 2 can connect through the communication network 10. The schedule information detecting unit 60 may access the schedule information stored in the server apparatus through the communication network 10, to detect the schedule of a user moving from the first geographical area to the second geographical area. The electronic device 2 may download the schedule information from the server apparatus, as necessary, for example by below-mentioned information acquisition unit 51, and may store the downloaded schedule information in the schedule information storing unit 51. The electronic device 2 may download the schedule information at any timing before moving to the second geographical area, when the schedule for moving to the second geographical area is detected, for example.

As for the schedule information in another embodiment, any of the information elements depicted in FIG. 5A and FIG. 5B may be omitted. For example, all or any of the information elements "content of schedule", "area flag", "regional name", "airline" and "flight number" may be omitted according to the constitution in the embodiment.

When the schedule of movement from the first geographical area to the second geographical area is detected, the information acquisition unit 61 downloads the route information and the map information in the second geographical area from the route retrieval server 4 and the map server 5, respectively, at the time before a movement to the second geographical area. In other words, the information acquisition unit 61 downloads the route information and the map information in the second geographical area, during the electronic device 2 exists within the first geographical area. The information acquisition unit 61 stores the route information and map information which are downloaded through the communication unit 42, in the route information storing unit 52 and the map information storing unit 53, respectively. Note that the route information storing unit 52 and the map information storing unit 53 are examples of a position-dependent information storing unit.

For example, the information acquisition unit 61 downloads the route information for a movement between the implementation places of respective schedules in the second geographical area included in the user's schedule information, and the peripheral map information of the implementation place of schedules. The information acquisition unit 61 may download the route information from the arrival point of the first movement to the implementation place of the first schedule which is planned to be executed in the second geographical area. Similarly, the information acquisition unit 61 may download the route information from the implementation place of the last schedule which is planned to be executed in the second geographical area to the departure point of the second movement.

The information acquisition unit 61 downloads, from the route retrieval server 4, the coordinate information of the implementation place of each schedule in the second geographical area included in user's schedule information. The information acquisition unit 61 stores the downloaded coordinate information in the coordinate information storing unit 56.

The timing for the information acquisition unit 61 downloads the route information, the map information, and the coordinates may be designated by the center server 3. For example, the center server 3 may transmit, to the electronic device 2, the time information which designates the time at which the information acquisition units 61 downloads data. The electronic device 2 may download the route information, the map information, and the coordinate information at the time designated by the center server 3 on the previous day of the movement to the second geographical area, for example.

Next, an example of processing which acquires the route information, the map information, and the coordinate information according to the schedule information depicted in FIGS. 5A and 5B, is illustrated as an example of processing by the information acquisition unit 61. The information acquisition unit 61 performs the following acquisition processing (1) to (3).

(1) Acquisition processing of the route information, the map information, and the coordinate information from the arrival point of the first movement to the first schedule after the first movement.

(2) Acquisition processing of the route information, the map information, and the coordinate information in the second geographical area.

(3) Acquisition processing of the route information, the map information, and the coordinate information from the last schedule before the second movement to the departure point of the second movement.

(1) Acquisition processing of the route information and the map information from the arrival point of the first movement to the first schedule after the first movement.

The information acquisition unit 61 detects the schedule information of the first schedule after the first movement. The information acquisition unit 61 transmits the position information request which designates the information element "arrival airport" in the first schedule after the first movement to the route retrieval server 4. The information acquisition unit 61 stores in the coordinate information storing unit 56 the coordinate information transmitted from the route retrieval server 4 in response to the route retrieval request.

The information acquisition unit 61 acquires the route information from the arrival point of the first movement to the implementation place of the first schedule after the first movement. The information acquisition unit 61 transmits, to route retrieval server 4, the route retrieval request which designates the information elements "arrival airport", "arrival date and time", and "place" of the first schedule after the first movement as the "departure place", the "departure time", and the "arrival place", respectively. The information acquisition unit 61 stores in the route information storing unit 52 the route information transmitted from the route retrieval server 4 in response to the route retrieval request. In the following illustration, when the route to the implementation place for a certain schedule has been acquired, the schedule may be referred to as a "route acquired schedule".

The information acquisition unit 61 transmits, to the map server 5, the map information request which designates the information element "place" of the first schedule after the first movement, and receives the map information centering on the information element "place". The information acquisition unit 61 stores the received map information in the map information storing unit 53.

The first schedule after the first movement illustrated in FIG. 5A and FIG. 5B, is a schedule with the schedule item number "3", and the "arrival airport", the "arrival date and time", and the "place" are the "EEE International Airport International Airport", "7:50 on Dec. 12, 2010", and the "DDD Exchange", respectively. An example of the route information acquired from the route retrieval server 4 according to the information elements is depicted in FIG. 6A.

As a first proposal, the route information is acquired according to which a user rides on a subway (JJJ Line) which leaves EEE Airport Station at 8:30 on Dec. 12, 2010, and arrives at KKK Station at 9:10, and after that, walks LLL Street for 3 minutes to arrive at DDD Exchange at 9:13, on the same day. As a second proposal, the route information is acquired according to which a user rides on a bus (Airport Liner) which leaves EEE Airport Station at 8:40 and arrives at KKK Station at 9:40, and after that, walks LLL Street for 3 minutes to arrive at DDD Exchange at the 9:43, on the same day. When the information acquisition unit 61 acquires the route information depicted in FIG. 6A, the schedule with the schedule item number "3" becomes the route that is a route acquired schedule.

The information acquisition unit 61 receives, from the map server 5, the map centering on "DDD Exchange" which is the "place" of the schedule information with the schedule item number "3". The map information includes the image of the map with a predetermined scale. The information acquisition unit 61 may receive the map information with different scales S1 to S8 from the map server 5. In the present description, term "scale" is used with the meaning that a larger scale map is reduced in size. The relation between the scales S1 to S8 may be S1>S2>S3>S4>S5>S6>S7>S8. The information acquisition unit 61 stores the received map information in the map information storing unit 53.

Figure 7A:
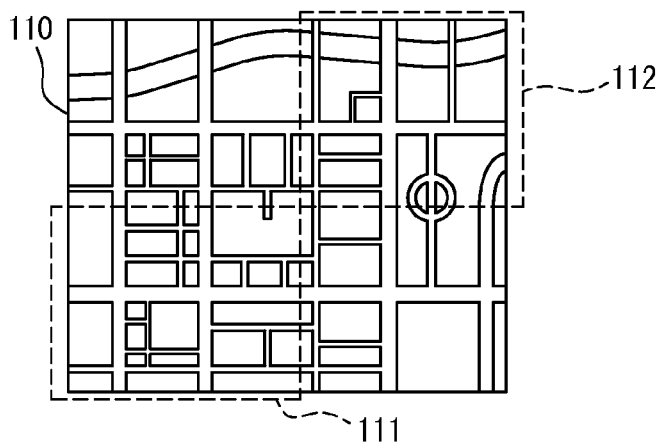
FIG. 7A to FIG. 7E are diagrams depicting examples of map information.
Figure 7B:
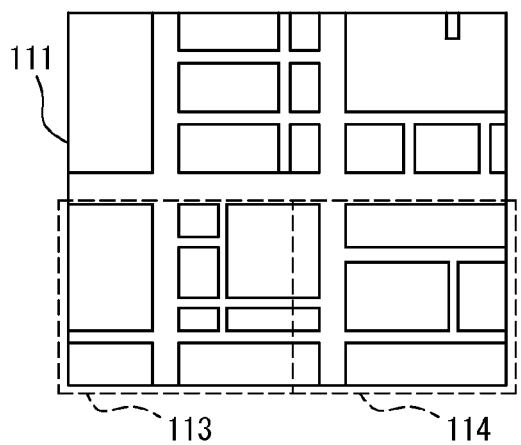
Figure 7C:
Figure 7D:
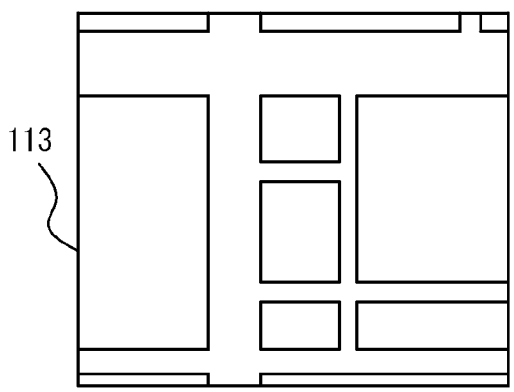
Figure 7E:
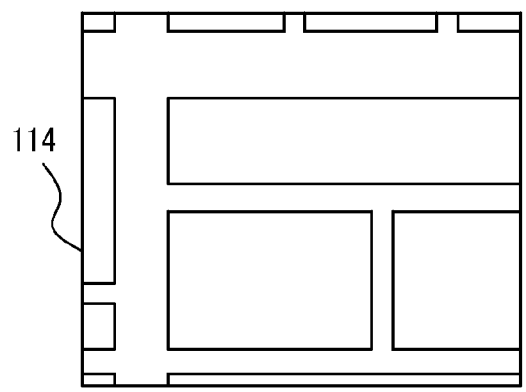

FIG. 7A to FIG. 7E are exemplary diagrams of the map information depicting the examples of the map information received from the map server 5. In the present examples, the scale of the map information item 110 in FIG. 7A is S5, the scale of the map information items 111 and 112 in FIG. 7B and FIG. 7C is S6, and the scale of the map information items 113 and 114 in FIG. 7D and FIG. 7E is S7.

In the present examples, the map information items 111 and 112 of FIG. 7B and FIG. 7C are the map information items in which a part of area presented by the map information 110 of FIG. 7A is enlarged. Moreover, the map information items 113 and 114 of FIG. 7D and FIG. 7E are the map information items in which a part of area presented by the map information 111 of FIG. 7B is enlarged. As the present examples, the information acquisition unit 61 may acquire a plurality of map information items with relatively small scales, with respect to a plurality of different ranges where the range in the map information with relatively large scale centering on the "place" of the schedule information is divided.

(2) Acquisition processing of the route information and the map information in the second geographical area.

Next, the information acquisition unit 61 transmits, to the route retrieval server 4, the position information request which designates the information element "place" of the subsequent schedule of the route acquired schedule. The information acquisition unit 61 stores, in the coordinate information storing unit 56, the coordinate information transmitted from the route retrieval server 4 in response to the route retrieval request.

The information acquisition unit 61 acquires the route information from the implementation place of the route acquired schedule to the implementation place of the subsequent schedule in the second geographical area. The information acquisition unit 61 transmits, to the route retrieval server 4, the route retrieval request which designates the information element "place" of the route acquired schedule as the "departure place", and the "place" and the "starting date and time" of the subsequent schedule of the route acquired schedule as the "arrival place" and the "arrival time", respectively. The information acquisition unit 61 stores, in the route information storing unit 52, the route information transmitted from the route retrieval server 4 in response to the route retrieval request.

The information acquisition unit 61 transmits, to the map server 5, the map information request which designates the information element "place" of the subsequent schedule of the route acquired schedule, and receives the map information centering on the information element "place". The information acquisition unit 61 stores the received map information in the map information storing unit 53.

The "place" of the schedule with the schedule item number "3" depicted in FIG. 5A and FIG. 5B is the "DDD Exchange". The "place" and the "starting date and time" of the schedule with the schedule item number "4", which are the subsequent schedule, are "FFF Federal Reserve Bank" and "14:00 on Dec. 12, 2010", respectively. An example of the route information acquired from the route retrieval server 4 according to these information elements is depicted in FIG. 6B.

The information acquisition unit 61 acquires the route information according to which a user leaves the DDD Exchange at 13:58, and walks MMM Street for 2 minutes and arrives at FFF Federal Reserve Bank at 14:00, on Dec. 12, 2010. The information acquisition unit 61 receives, from the map server 5, the map centering on "FFF Federal Reserve Bank" which is the "place" of the schedule information with the schedule item number "4". In this case, when DDD Exchange is close to FFF Federal Reserve Bank, the information acquisition unit 61 may acquire the same map information acquired at the time of acquiring the map information centering on "DDD Exchange".

After that, the information acquisition unit 61 repeats "(2) acquisition processing of the route information and the map information in the second geographical area" until the last schedule before the second movement becomes a state of route acquired.

(3) Acquisition processing of the route information and the map information from the last schedule before the second movement to the departure point of the second movement.

The information acquisition unit 61 detects the schedule information of the first schedule after the second movement. The information acquisition unit 61 transmits, to the route retrieval server 4, the position information request which designates the information element "departure airport" in the first schedule after the second movement. The. information acquisition unit 61 stores, in the coordinate information storing unit 56, the coordinate information transmitted from the route retrieval server 4 in response to the route retrieval request.

The information acquisition unit 61 acquires the route information from the implementation place of the last schedule before the second movement to the departure point of the second movement. The information acquisition unit 61 transmits, to the route retrieval server 4, the route retrieval request which designates the information element "place" of the last schedule before the second movement, the information elements "departure airport" and "departure date and time" of the first schedule after the second movement, as the "departure place", the "arrival place", and the "arrival time", respectively. The information acquisition unit 61 stores, in the route information storing unit 52, the route information transmitted from the route retrieval server 4 in response to the route retrieval request.

The information acquisition unit 61 transmits, to the map server 5, the map information request which designates the information element "departure airport" of the first schedule after the second movement, and receives the map information centering on the information element "departure airport". The information acquisition unit 61 stores the received map information in the map information storing unit 53.

The last schedule before the second movement depicted in FIG. 5A and FIG. 5B is a schedule with the schedule item number "5", and the information element "place" is "GGG Hotel". The first schedule after the second movement is a schedule with the schedule item number "6", and the "departure airport" and the "departure date and time" are "EEE International Airport International Airport" and "11:15 on Dec. 13, 2010", respectively. The example of the route information acquired from the route retrieval server 4 according to these information elements is depicted in FIG. 6C.

As a first proposal, the route information is acquired according to which a user leaves GGG Hotel at 8:30 on Dec. 13, 2010, and walks LLL Street for 4 minutes, rides on a subway (JJJ Line) which leaves KKK Station at 9:20, and after that, arrives at EEE Airport Station at 10:00, on the same day. As a second proposal, the route information is acquired according to which a user leaves GGG Hotel at 8:40, walks LLL Street for 4 minutes, rides on a bus (Airport Liner) which leaves KKK Station at 9:15, and after that, arrives at EEE Airport Station at 10:15, on the same day.

The information acquisition unit 61 receives, from the map server 5, the map centering on "EEE International Airport Station" which is the "departure airport" of the schedule information with the schedule item number "6". The information acquisition unit 61 stores the received map information in the map information storing unit 53.

The information acquisition unit 61 measures a quantity of information which is received from the route retrieval server 4 and the map server 5, and which is accumulated in the route information storing unit 52 and the map information storing unit 53, and generates the accumulated information quantity data which indicates the measured quantity of information. The information acquisition unit 61 stores the generated accumulated information quantity data in the accumulated information storing unit 54.

FIG. 8 depicts an example of the accumulated information quantity data stored in the accumulated information storing unit 54. The accumulated information quantity data includes the information elements "data identifier" and "data quantity". The data identifier is an identifier for identifying each information item downloaded from the route retrieval server 4 and the map server 5. For example, the data identifier "r001" is an identifier of the route information to reach "DDD Exchange" from "EEE International Airport International Airport" depicted in FIG. 6A. The data identifier "r002" is an identifier of the route information to reach "FFF Federal Reserve Bank" from the "DDD Exchange" depicted in FIG. 6B. Moreover, the data identifier "r003" is an identifier of the route information to reach "EEE International Airport" from "GGG Hotel" depicted in FIG. 6C.

The data identifiers "m101" to "m501" are identifiers of the map information items with the scales S1 to S5, respectively. The data identifiers "m601" to "m604" are identifiers for the different ranges of the map information with the scale S6. Similarly, the data identifiers "m701" to "m704" are identifiers for the different ranges of the map information with the scale S7. The data identifiers "m801" to "m804" are identifiers for the different ranges of the map information with the scale S8.

The information element "data quantity" indicates the data quantity of the information of each data identifier. For example, in the example depicted in FIG. 8, the data quantity of the data identifier "r001" is 1200 bytes. Note that the information element "data quantity" may be stored in an external storage device to which the electronic device 2 can access, in association with a data identifier. In this case, it is possible to omit the information element "data quantity" from the accumulated information storing unit 55. For example, the external storage device may be a server apparatus to which the electronic device 2 can connect through the communication network 10.

The information acquisition unit 61 generates the used information quantity data, and stores the data in the used information storing unit 55. An example of the used information quantity data stored in the used information storing unit 55 is depicted in FIG. 9. The used information quantity data may be the data which the information element "used flag" is added to the accumulated information quantity data. For the used information quantity data, the information element "data quantity" may be stored in an external storage device to which the electronic device 2 can access, in association with a data identifier.

When the used flag of a certain data identifier is "OFF", the used information quantity data indicates that the information corresponding to the data identifier has not been output from the output unit 35. When the used flag of a certain data identifier is "ON", the used information quantity data indicates that the information corresponding to the data identifier has been output from the output unit 35 and has been used by a user. In the following illustration, the information with the used flag which is set "ON" may referred to as "used information".

The used information quantity data indicates the information quantity of the used information by specifying the identifiers of the used information by the used flags. At the time when the information acquisition unit 61 downloads, from the route retrieval server 4 and the map server 5, the used flag of all used information quantity data is "OFF".

Referring to FIG. 4. The output information control unit 62, in accordance with the position of the electronic device 2 measured by the positioning unit 43, retrieves the route information and the map information from the route information storing unit 52 and the map information storing unit 53, respectively, and outputs the retrieved information through the output unit 35.

The output information control unit 62 determines whether or not the electronic device 2 is located in the second geographical area based on the position information of the electronic device 2 measured by the positioning unit 43. The output information control unit 62 is permitted to start the location-based service which presents, to a user, the route information and the map information stored in the route information storing unit 52 and the map information storing unit 53, when determining that the electronic device 2 is located in the second geographical area.

In some embodiments, when the output information control unit 62 determines that the electronic device 2 is located in the second geographical area, the output information control unit 62 may output, from the output unit 35 to the user, a message which prompts a user to use the location-based service which presents the route information. When a user performs an operation to select a use of the location-based service at the input unit 41, the output information control unit 62 may start providing the location-based service.

The output information control unit 62 retrieves, from the route information storing unit 52, the route information to reach the implementation place of each schedule registered in the schedule information, and outputs the retrieved route information through the output unit 35. When the route information depicted in FIG. 6A to FIG. 6C is stored in the route information storing unit 52, the output information control unit 62 first outputs the route information depicted in FIG. 6A which is the route information to reach DDD Exchange which is the implementation place of the schedule with the schedule item number "3" being the first schedule after the first movement.

The output information control unit 62 compares the position information of the electronic device 2 measured by the positioning unit 43 with the coordinate information of the implementation place of each schedule stored in the coordinate information storing unit 56. When the distance between the measured position information of the electronic device 2 and the coordinate information of the implementation place of each schedule falls within a predetermined range, the output information control unit 62 may determine that the device has arrived at the implementation place. When a user has arrived at the implementation place of each schedule, the output information control unit 62 retrieves, from the route information storing unit 52, the route information to reach the implementation place of a subsequent schedule registered in the schedule information, and outputs the retrieved route information through the output unit 35.

For example, after outputting the route information depicted in FIG. 6A, the output information control unit 62 compares the position information of the electronic device 2 measured by the positioning unit 43 with the coordinate information stored in the coordinate information storing unit 56 about DDD Exchange which is the implementation place of the schedule with the schedule item number "3". When the distance between the position of the electronic device 2 and the coordinate information of DDD Exchange falls within the predetermined range, the output information control unit 62 determines that the user has arrived at DDD Exchange, and outputs the route information depicted in FIG. 6B, which is the route information to reach the implementation place of the schedule with the schedule item number "4" which is the subsequent schedule.

The output information control unit 62 determines whether or not the electronic device 2 is located within the range of the map information stored in the map information storing unit 53. When the electronic device 2 is located within the range of the stored map information, the output information control unit 62 may output, from the output unit 35 to a user, a message which prompts a user to use the location-based service which presents the map information. When a user performs an operation to select the use of the location-based service at the input unit 41, the output information control unit 62 may start providing the location-based service.

After that, the output information control unit 62 outputs the map information from the output unit 35, when the electronic device 2 is located within the range of the map information stored in the map information storing unit 53. The output information control unit 62 continuously acquires the position information of the current position of the electronic device 2, and retrieves the map information according to the acquired current position from the map information storing unit 53. The output information control unit 62 then outputs the retrieved map information through the output unit 35.

The output information control unit 62 may receive an input operation to change the scale of the map, the input operation being performed by a user through the input unit 41. When the input operation to change the scale is received, the output information control unit 62 may retrieve the map information of the changed scale from the map information storing unit 53, and may output the retrieved map information to the output unit 35. At this time, the output information control unit 62 may adjust the output range so that the current position of the electronic device 2 may be located at the center of the output range.

Whenever the user arrives at the implementation place of each schedule, the output information control unit 62 determines whether or not the subsequent schedule is a schedule in the first geographical area. For example, the output information control unit 62 may determine whether or not the subsequent schedule is the schedule in the first geographical area by referring to the information element "area flag" of the subsequent schedule. In other embodiments, the output information control unit 62 may determine whether or not the subsequent schedule is the schedule in the first geographical area by referring to the information element "place" of the subsequent schedule.

When the subsequent schedule is a schedule in the first geographical area, i.e., a first schedule after the second movement, the output information control unit 62 retrieves, from the route information storing unit 52, the route information from the last schedule before the second movement to the departure point of the second movement, and outputs the retrieved route information through the output unit 35.

For example, when a user arrives at the implementation place of the schedule with the schedule item number "5" depicted in FIG. 5A and FIG. 5B, i.e., GGG Hotel, the output information control unit 62 determines that the subsequent schedule with the schedule item number "6" is the schedule in the first geographical area. The output information control unit 62 outputs the route information depicted in FIG. 6C which is the route information from the last schedule before the second movement to the departure point of the second movement.

When retrieving the information from the route information storing unit 52 and the map information storing unit 53, the output information control unit 62 updates the used information quantity data stored in the used information quantity storing unit 55. The output information control unit 62 sets the value of the used flag stored corresponding to the identifier of the retrieved information to "ON", and stores a fact that the retrieved information is the used information.

The used information quantity transmitting unit 63 determines whether or not the second movement for moving to the first geographical area from the second geographical area has been performed. For example, the used information quantity transmitting unit 63 may determine whether or not the electronic device 2 is located in the first geographical area based on the position of the electronic device 2 measured by the positioning unit 43. When the electronic device 2 is located in the first geographical area, the used information quantity transmitting unit 63 may output a message for inquiring a user whether the second movement has been performed through the output unit 35. When a user operates the input unit 41 for answering that the second movement has been performed, the used information quantity transmitting unit 63 may determine that the second movement has been performed.

When it is determined that the second movement has been performed, the used information quantity transmitting unit 63 determines the information quantity of the used information by referring to the used information quantity data stored in the used information quantity storing unit 55. When the information element "data quantity" of the used information quantity data is stored in the external storage device, the used information quantity transmitting unit 63 accesses the external storage device to acquire the information quantity data of the used information.

The used information quantity transmitting unit 63 transmits the information quantity data indicating the information quantity of the used information to the billing server 6 through the communication unit 42, as the information quantity data of the information acquired by the electronic device 2 from the information distribution system 1. The billing server 6 determines the charging amount for the information used by the electronic device 2 in the second geographical area according to the information quantity data transmitted from the used information quantity transmitting unit 63.

Figure 10:
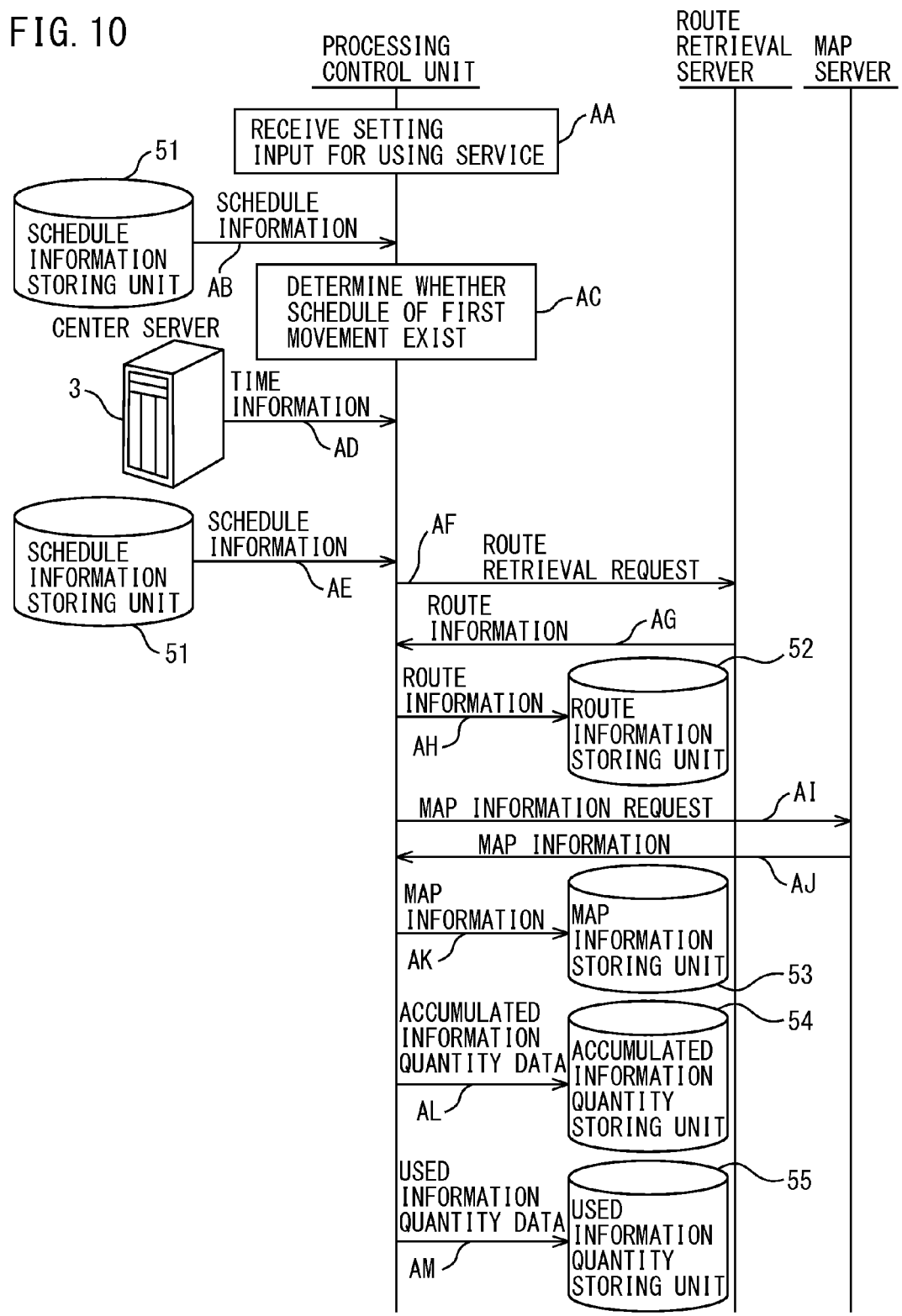
FIG. 10 is an explanatory diagram of processing which accumulates the route information and the map information.

Next, the processing performed in the information distribution system 1 will be illustrated. First, processing for accumulating the route information and the map information by the electronic device 2 in the first geographical area will be illustrated. FIG. 10 is an explanatory diagram of processing which accumulates the route information and the map information. Note that, in other embodiments, each operation of following operations AA to AM may be a step.

In operation AA, the processing control unit 44 receives a setting input for using a service of the information distribution system 1 which is input through the input unit 41 operated by a user. The setting inputs for using the service may be an input operation which indicates that the user acknowledged the term of use of the service and an input of a user's registration information.

In operation AB, the schedule information detecting unit 60 of the processing control unit 44 retrieves the schedule information from schedule information storing unit 51. In operation AC, the schedule information detecting unit 60 detects the schedule of the first movement from the first geographical area to the second geographical area. When there is the schedule of the first movement, in operation AD, the information acquisition unit 61 receives, from the center server 3, the time information designating the time at which the route information and the map information in the second geographical area are downloaded.

When the time according to the time information received from the center server 3 comes, which is predetermined period earlier than the date of the first movement, the information acquisition unit 61 retrieves the schedule information from the schedule information storing unit 51 in operation AE. In the following operations AD to AM, the information acquisition unit 61 performs above-mentioned acquisition processing (1) to (3).

In operation AF, the information acquisition unit 61 transmits, to the route retrieval server 4, the route retrieval requests which require the route information to respective place points in the second geographical area. In operation AG, the route retrieval server 4 transmits the route information to the electronic device 2 in response to respective route retrieval requests. In operation AH, the information acquisition unit 61 stores the received route information in the route information storing unit 52.

In operation AI, the information acquisition unit 61 transmits map information requests, to the map server 5, which require the map information in the second geographical area. In operation AJ, the map server 5 transmits the map information to the electronic device 2 in response to respective map information requests. In operation AK, the information acquisition unit 61 stores the received map information in the map information storing unit 53.

In operation AL, when the route information and the map information are received, the information acquisition unit 61 stores the accumulated information quantity data which indicates the information quantity of the information in the accumulated information quantity storing unit 54. In operation AM, the information acquisition unit 61 stores the used information quantity data corresponding to the accumulated information quantity data in the used information quantity storing unit 55.

Figure 11:
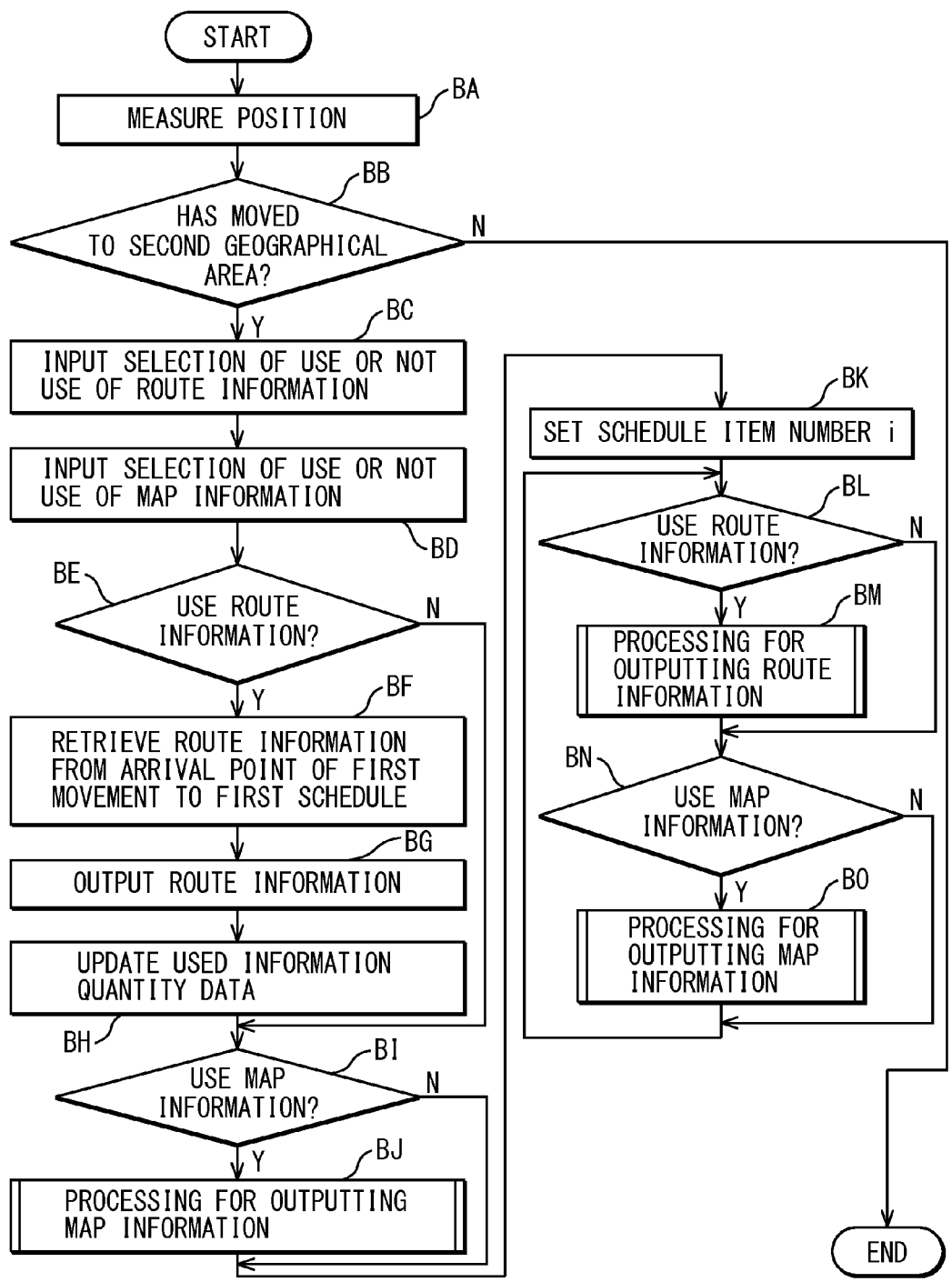
FIG. 11 is an explanatory diagram of a first example of processing performed at the time of using the route information and the map information.

Next, processing in the electronic device 2 for a user to use the route information and the map information in the second geographical area will be illustrated. FIG. 11 is an explanatory diagram of a first example of processing performed at the time of using the route information and the map information. Note that, in other embodiments, each operation of following operations BA to BO may be a step.

In operation BA, the positioning unit 43 measures the position of the electronic device 2. In operation BB, the output information control unit 62 determines whether or not the electronic device 2 is located in the second geographical area in accordance with the position information measured by the positioning unit 43. When the electronic device 2 is located in the second geographical area (operation BB: Y), processing proceeds to operation BC. When the electronic device 2 is not located in the second geographical area (operation BB: N), processing is terminated.

In operation BC, the output information control unit 62 outputs, from the output unit 35, a message which prompts a user to use the service which presents the route information to the user, and receives an operation that the user selects the use of the route information. When the electronic device 2 enters the range of the map information stored in the map information storing unit 53, in operation BD, the output information control unit 62 outputs, from the output unit 35, the message which prompts a user to use the service which presents the map information to the user. The output information control unit 62 receives an operation that the user selects the use of the map information.

In operation BE, the output information control unit 62 determines whether or not a user has selected the use of the route information. When the user has selected the use of the route information (operation BE: Y), processing proceeds to operation BF. When the user has not selected the use of the route information (operation BE: N), processing proceeds to operation BI.

In operation BF, the output information control unit 62 retrieves, from the route information storing unit 52, the route information from the arrival point of the first movement to the first schedule after the first movement, which is acquired in the above-mentioned acquisition processing (1). In operation BG, the output information control unit 62 outputs the retrieved route information from the output unit 35. In operation BH, the output information control unit 62 updates the used information quantity data by setting the used flag of the route information to ON, the route information being retrieved in operation BF, among the used information quantity data stored in the used information quantity storing unit 55.

In operation BI, the output information control unit 62 determines whether or not a user has selected the use of the map information. When the user has selected the use of the map information (operation BI: Y), processing proceeds to operation BJ. When the user has not selected the use of the map information (operation BI: N), processing proceeds to operation BK.

Figure 12:
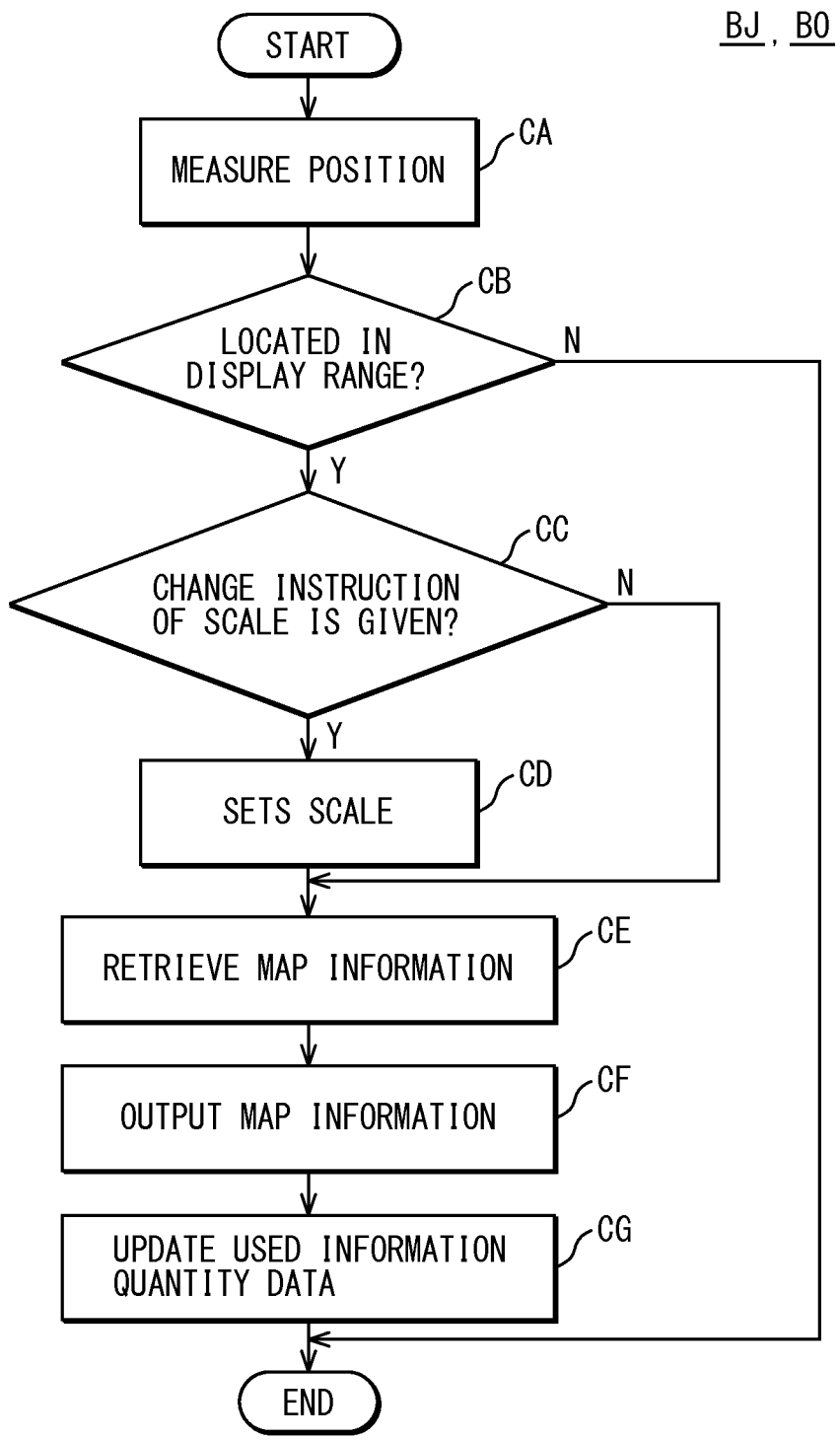
FIG. 12 is an explanatory diagram of processing which outputs the map information.

In operation BJ, the output information control unit 62 performs processing for outputting the map information. FIG. 12 is an explanatory diagram of processing which outputs the map information. Note that, in other embodiments, each operation of following operations CA to CG may be a step.

In operation CA, the positioning unit 43 measures the position of the electronic device 2. In operation CB, the output information control unit 62 determines whether or not the electronic device 2 is located in a display range of the map information stored in the map information storing unit 53. When the electronic device 2 is located in the display range (operation CB: Y), processing proceeds to operation CC. When the electronic device 2 is not located in the display range (operation CB: N), processing is terminated.

In operation CC, the output information control unit 62 determines whether or not a change instruction of a scale of the map given by a user is received. When the change instruction is received (operation CC: Y), processing proceeds to operation CD. When the change instruction is not received (operation CC: N), processing proceeds to operation CE.

In operation CD, the output information control unit 62 sets the scale of the map information to be retrieved from the map information storing unit 53. After that, processing proceeds to operation CE. In operation CE, the output information control unit 62 retrieves the map information from the map information storing unit 53. In operation CF, the output information control unit 62 outputs the retrieved map information from the output unit 35. At this point, the output information control unit 62 may adjust the output range so that the current position of the electronic device 2 is located at the center of the output range.

In operation CG, the output information control unit 62 updates the used information quantity data by setting the used flag of the map information to ON, the map information being retrieved in operation CE, among the used information quantity data stored in the used information quantity storing unit 55.

Referring to FIG. 11. In operation BK, the output information control unit 62 designates the value of variable i, which designates the schedule item number for which the route information is displayed, to be the schedule item number of the first schedule after the first movement. The value of variable i is set to "3" for the schedule information depicted in FIG. 5A and FIG. 5B.

In operation BL, the output information control unit 62 determines whether or not a user has selected the use of the route information. When a user has selected the use of the route information (operation BL: Y), processing proceeds to operation BM. When a user has not selected the use of the route information (operation BL: N), processing proceeds to operation BN.

Figure 13:
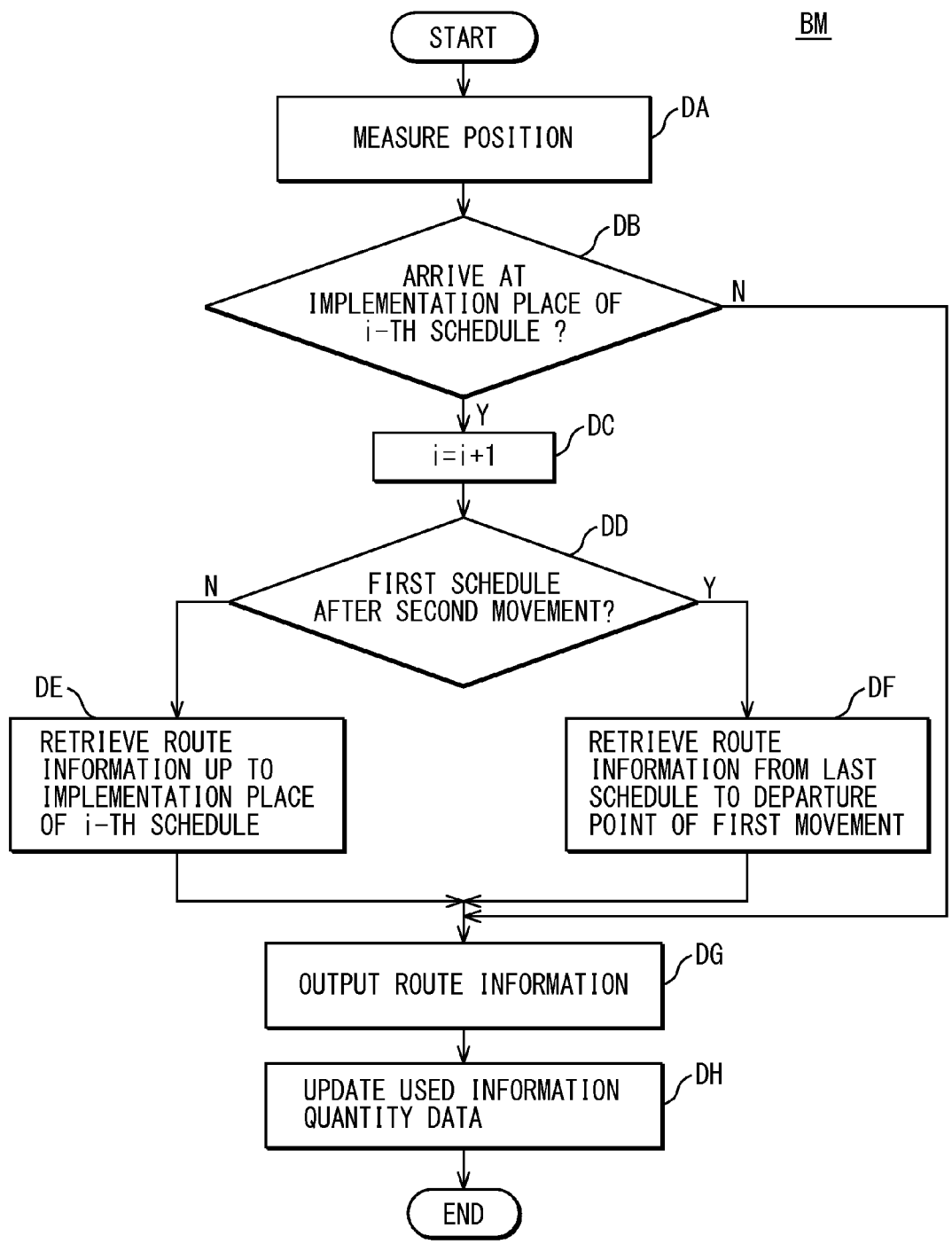
FIG. 13 is an explanatory diagram of processing which outputs the route information.

In operation BM, the output information control unit 62 performs processing for outputting the route information. FIG. 13 is an explanatory diagram of processing which outputs the route information. Note that, in other embodiments, each operation of following operations DA to DH may be a step.

In operation DA, the positioning unit 43 measures the position of the electronic device 2. In operation DB, the output information control unit 62 compares the coordinate information of the implementation place of the ith schedule with the position information of the measured electronic device 2, and determines whether or not a user arrives at the implementation place of the ith schedule. When a user arrives at the implementation place of the ith schedule (operation DB: Y), processing proceeds to operation DC. When a user does not arrive at the implementation place of the ith schedule (operation DB: N), processing proceeds to operation DG.

In operation DC, the output information control unit 62 sets the schedule for which the route information is displayed as the subsequent schedule, by incrementing the value of variable i by one, the value of variable i designating the schedule item number for which the route information is displayed.

In operation DD, the output information control unit 62 determines whether the ith schedule is the first schedule after the second movement. When the ith schedule is the first schedule after the second movement (operation DD: Y), processing proceeds to operation DF. When the ith schedule is not the first schedule after the second movement (operation DD: N), processing proceeds to operation DE.

In operation DE, the output information control unit 62 retrieves the route information to the implementation place of the ith schedule acquired in the above-mentioned acquisition processing (2) from the route information storing unit 52. After that, processing proceeds to operation DG. In operation DF, the output information control unit 62 retrieves the route information from the last schedule before the second movement to the departure point of the second movement, which is acquired in the above-mentioned acquisition processing (3), from the route information storing unit 52. After that, processing proceeds to operation DG. In operation DG, the output information control unit 62 outputs the retrieves route information from the output unit 35.

In operation DH, the used information quantity data is updated by setting the used flag of the route information to ON, the route information being retrieved in operation DE or operation DF, among the used information quantity data stored in used information quantity storing unit 55.

Referring to FIG. 11. In operation BN, the output information control unit 62 determines whether or not a user has selected the use of the map information. When the user has selected the use of the map information (operation BN: Y), processing proceeds to operation BO. When the user has not selected the use of the map information (operation BN: N), processing returns to operation BL. In operation BO, the output information control unit 62 performs processing for outputting the map information. The processing of operation BO is substantially the same as the processing of operation BJ illustrated with reference to FIG. 12. Processing returns to operation BL after operation BO.

Next, processing in the electronic device 2 for a user to use the route information and the map information by in the second geographical area will be illustrated.

Next, the billing processing performed in the first geographical area after the second movement will be illustrated. FIG. 14 is an explanatory diagram of billing processing. Note that, in other embodiments, each operation of following operations EA to EF may be a step.

In operation EA, the positioning unit 43 measures the position of the electronic device 2. In operation EB, the used information quantity transmitting unit 63 receives the position information of the electronic device 2. In operation EC, the used information quantity transmitting unit 63 determines whether or not the second movement for moving to the first geographical area from the second geographical area has been performed.

When it is determined that the second movement has been performed, in operation ED, the used information quantity transmitting unit 63 determines the information quantity of the used information by referring to the used information quantity data stored in the used information quantity storing unit 55. In operation EE, the used information quantity transmitting unit 63 transmits the information quantity data indicating the information quantity of the used information to the billing server 6. In operation EF, the billing server 6 performs the billing processing according to the information quantity data transmitted from the used information quantity transmitting unit 63.

According to the present embodiment, the electronic device 2 can use the location-based service in the second geographical area by using the position-dependent information of the second geographical area which is accumulated when the electronic device 2 is located in the first geographical area. Moreover, the billing processing is also performed when it is located in the first geographical area. Therefore, when using the location-based service in the second geographical area, the electronic device 2 can omit the use of the communication service in the second geographical area. Therefore, a user can receive the location-based service even when the user is difficult to receive the location-based service through the communication service in the second geographical area, or even when the user does not desire to receive such location-based service.

According to the present embodiment, it is possible to determine the charging amount in conformity with the actual usage, because of storing which information has been actually used in the second geographical area among the position-dependent information of the second geographical area accumulated in the first geographical area. Therefore, it is possible to prevent excessive billing for information which a user has not used.

Even if the information which a user is likely to use is predicted with an extra amount to be accumulated in the electronic device 2, it is possible to prevent the occurrence of charging a fee to the information which the user does not actually use. Therefore, more information can be stored in the electronic device 2 so as to provide the location-based service with high convenience.

Next, another embodiment of the electronic device 2 is illustrated. FIG. 15 is a diagram depicting a second configuration example of the electronic device. The same reference marks are assigned to the components same as the components depicted in FIG. 4. Operation of the components denoted by the same reference marks is the same unless otherwise indicated. The electronic device 2 includes an activation detecting unit 45. Moreover, the processing control unit 44 includes a position determination unit 64.

The position determination unit 64 receives a positioning result of the electronic device 2 performed by the positioning unit 43. The position determination unit 64 retrieves, from the coordinate information storing unit 56, the coordinate information of any place in the second geographical area stored in the coordinate information storing unit 56. The position determination unit 64 compares the coordinate information retrieved from the coordinate information storing unit 56 and the positioning result of the electronic device 2, to determine whether the electronic device 2 is located in the second geographical area. When the position determination unit 64 determines that the electronic device 2 is located in the second geographical area, the output information control unit 62 starts the location-based service which present to a user the route information and the map information stored in the route information storing unit 52 and the map information storing unit 53, respectively.

The coordinate information which is retrieved from the coordinate information storing unit 56 to be compared with the positioning result by the position determination unit 64 may be the coordinate information stored in the coordinate information storing unit 56 with respect to the implementation place of each schedule registered in the schedule information. The coordinate information which is retrieved from the coordinate information storing unit 56 to be compared with the positioning result by the position determination unit 64 may be the place information stored in the coordinate information storing unit 56 with respect to the information element "arrival airport" of the first schedule after the first movement. In other words, the coordinate information may be the coordinate information of the arrival point of the first movement. The arrival point of the first movement may be, for example, a departure-and-arrival place of the transportation in the second geographical area used for the first movement.

The activation detecting unit 45 detects that the electric power source of the electronic device 2 is switched from OFF to ON. The position determination unit 64 may determine whether or not the electronic device 2 is located in the second geographical area, only when the electric power source of the electronic device 2 is switched to ON by the activation detecting unit 45. When the movement to the second geographical area from the first geographical area is by an air flight, the electric power source of the electronic device 2 is made into an OFF state during the movement, and when arriving at the second geographical area, the electric power source of the electronic device 2 is switched ON.

Therefore, by determining the position of the electronic device 2 at the timing of switching on the electric power source of the electronic device 2, it is possible to guess that the electronic device 2 is located in the arrival airport for the air flight used for the movement to the second geographical area.

FIG. 16 is an explanatory diagram of a second example of processing performed at the time of using the route information and the map information. Note that, in other embodiments, each operation of following operations FA to FP may be a step.

In operation FA, the activation detecting unit 45 determines whether or not the electric power source of the electronic device 2 is switched from OFF to ON. When the electric power source of the electronic device 2 has been switched from OFF to ON (operation FA: Y), processing proceeds to operation FB. When the electric power source of the electronic device 2 has not been switched from OFF to ON (operation FA: N), processing returns to operation FA.

In operation FB, the positioning unit 43 measures the position of the electronic device 2. In operation FC, the position determination unit 64 determines whether or not the electronic device 2 is located in the second geographical area. When the electronic device 2 is located in the second geographical area (operation FC: Y), processing proceeds to operation FD, and the location-based service is started. When the electronic device 2 is not located in the second geographical area (operation FC: N), processing is terminated. The following operations FD to FP are substantially the same as the operation BC to BO illustrated with reference to FIG. 11.

According to the present embodiment, the location-based service which provides the information stored in the route information storing unit 52 and the map information storing unit 53 is started only when the electronic device 2 is located in the second geographical area. Therefore, the fault in the billing processing due to the service being incorrectly started in an area which is different from the second geographical area is prevented.

According to the present embodiment, it is possible to start a location-based service from the time when it is detected that the electronic device 2 is located at the arrival airport of the air flight for the movement to the second geographical area as planned. Therefore, since a location-based service does not start in a state where a user takes different action from a schedule, it is possible to prevent the occurrence of charging a fee due to a display of unnecessary information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An electronic device comprising:
   a schedule information detecting unit which detects a schedule according to which a user moves from a first geographical area to a second geographical area outside the first geographical area by accessing schedule information of the user;
   an information acquisition unit which acquires position dependent information in the second geographical area from a first server apparatus connected through a network before a timing of the schedule according to which the user moves to the second geographical area;
   a position dependent information storing unit which stores the position dependent information acquired;
   a positioning unit which measures a position of the electronic device;
   an output information control unit which retrieves the position dependent information corresponding to the position of the electronic device in the second geographical area measured by the positioning unit from the position dependent information storing unit to output through an output unit;
   an information quantity storing unit which stores information quantity data which indicates information quantity of the information retrieved from the position dependent information storing unit; and
   an information quantity transmitting unit which transmits the information quantity data which indicates information quantity and is stored in the information quantity storing unit to a second server apparatus connected through the network, when the electronic device is located outside the second geographical area.

2. The electronic device according to claim 1, further comprising:
   a coordinate information storing unit which stores coordinate information of any position in the second geographical area; and
   a position determination unit which determines whether or not the electronic device is located in the second geographical area by comparing measurement result of the positioning unit with the coordinate information stored in the coordinate information storing unit,
   wherein the output information control unit retrieves the position dependent information stored in the position dependent information storing unit, when it is determined that the electronic device is located in the second geographical area.

3. The electronic device according to claim 2, further comprising
   an activation detecting unit which detects that the electronic device is turned on,
   wherein the position determination unit determines whether or not the electronic device is located in the second geographical area when the electronic device is turned on.

4. The electronic device according to claim 2, wherein
the coordinate information corresponding to place information included in the schedule information is stored in the coordinate information storing unit as the coordinate information of the any position.

5. The electronic device according to claim 4, wherein
the coordinate information corresponding to arrival-and-departure place information on a transportation included in the schedule information is stored in the coordinate information storing unit as the place information, and
the position determination unit determines whether or not the electronic device is located in the second geographical area by comparing the measurement result of the positioning unit with the coordinate information corresponding to the arrival-and-departure place information.

6. The electronic device according to claim 1, wherein
the second server apparatus is an billing server apparatus which performs billing processing for acquisition fee of the position dependent information according to the information quantity data transmitted from the electronic device.

7. An information distribution system comprising:
an electronic device;
a first server apparatus; and
a second server apparatus, wherein the electronic device, the first server apparatus, and the second server apparatus are connected through a network,
and wherein, the electronic device includes:
a schedule information detecting unit which detects a schedule according to which a user moves from a first geographical area to a second geographical area outside the first geographical area by accessing schedule information of the user;
an information acquisition unit which acquires position dependent information in the second geographical area from the first server apparatus before a timing of the schedule according to which the user moves to the second geographical area;
a position dependent information storing unit which stores the position dependent information acquired;
a positioning unit which measures a position of the electronic device;
an output information control unit which retrieves the position dependent information corresponding to the position of the electronic device in the second geographical area measured by the positioning unit from the position dependent information storing unit to output through an output unit;
an information quantity storing unit which stores information quantity data which indicates information quantity of the information retrieved from the position dependent information storing unit; and
an information quantity transmitting unit which transmits the information quantity data which indicates the information quantity and is stored in the information quantity storing unit to the second server apparatus, when the electronic device is located outside the second geographical area.

8. A computer-readable, non-transitory medium storing a computer program causing a processor included in an electronic device to execute a process, the process comprising:
detecting a schedule according to which a user moves from a first geographical area to a second geographical area outside the first geographical area by accessing schedule information of the user;
acquiring position dependent information in the second geographical area, from a first server apparatus connected to the electronic device through a network before a timing of the schedule according to which the user moves to the second geographical area;
storing, into a storing unit of the electronic device, the position dependent information acquired;
measuring a position of the electronic device;
retrieving the position dependent information corresponding to the position of the electronic device in the second geographical area from the storing unit to output;
storing, into the storing unit, information quantity data which indicates information quantity of the information retrieved from the storing unit; and
transmitting the information quantity data which is stored in the storing unit to a second server apparatus connected to the electronic device through the network, when the electronic device is located outside the second geographical area.

9. A position dependent information providing method for providing position dependent information to an electronic device, the position dependent information providing method causing the electronic device to execute a process, the process comprising:
detecting a schedule according to which a user moves from a first geographical area to a second geographical area outside the first geographical area by accessing schedule information of the user;
acquiring position dependent information in the second geographical area, from a first server apparatus connected to the electronic device through a network before a timing of the schedule according to which the user moves to the second geographical area;
storing, into a storing unit of the electronic device, the position dependent information acquired;
measuring a position of the electronic device;
retrieving the position dependent information corresponding to the position of the electronic device in the second geographical area from the storing unit to output;
storing, into the storing unit, information quantity data which indicates information quantity of the information retrieved from the storing unit; and
transmitting the information quantity data which is stored in the storing unit to a second server apparatus connected to the electronic device through the network, when the electronic device is located outside the second geographical area.

* * * * *